March 13, 1962 P. R. HASKELL ETAL 3,024,531
CARTRIDGE-POWERED PISTON TYPE TOOL
Original Filed May 10, 1955 12 Sheets-Sheet 9
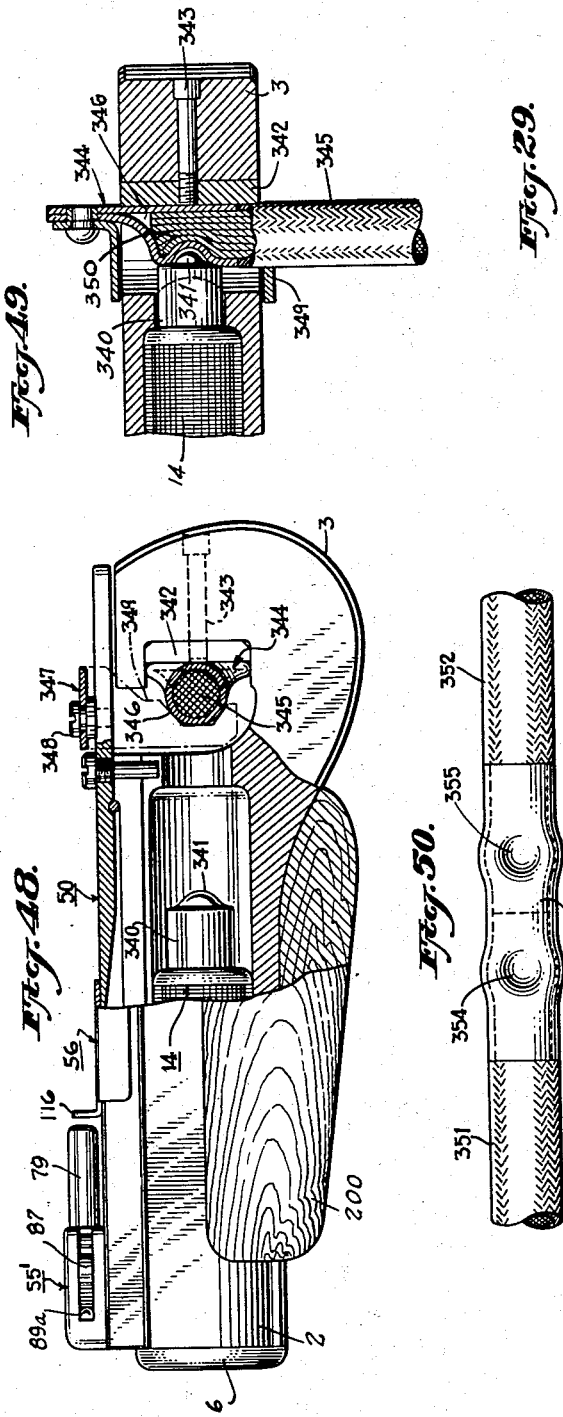
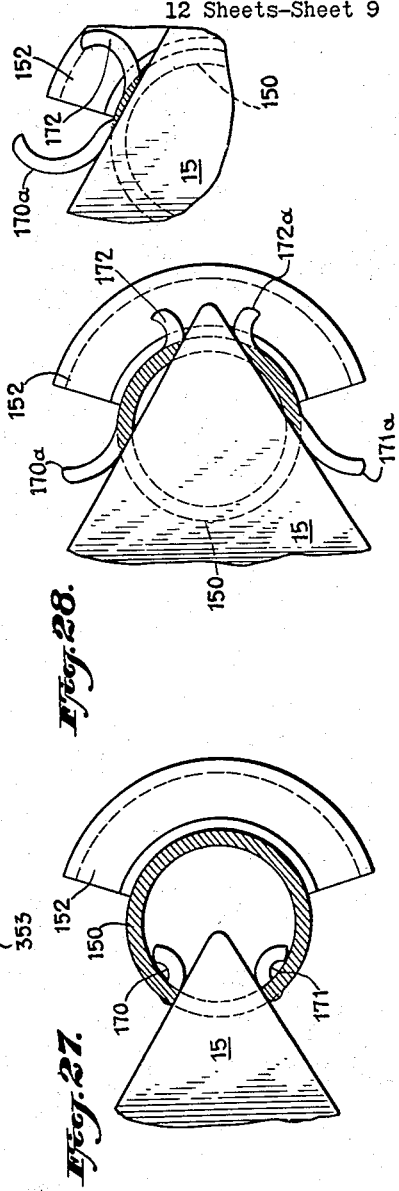
INVENTORS.
PHILIP R. HASKELL.
RICHARD E. EVANS.
BY PAUL A. KETCHPEL JR.
LYLE B. CONNOR.
ATTORNEYS.

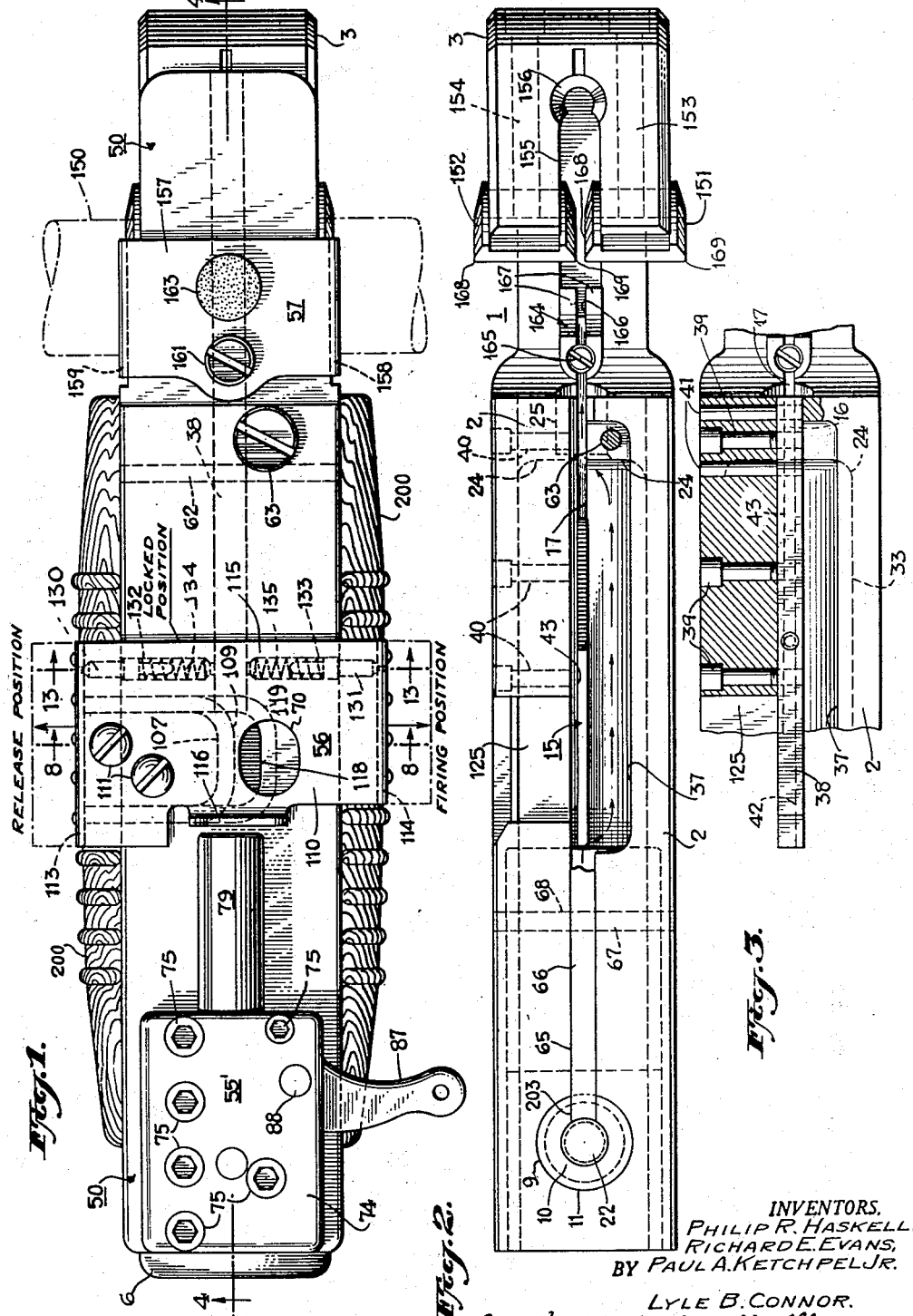

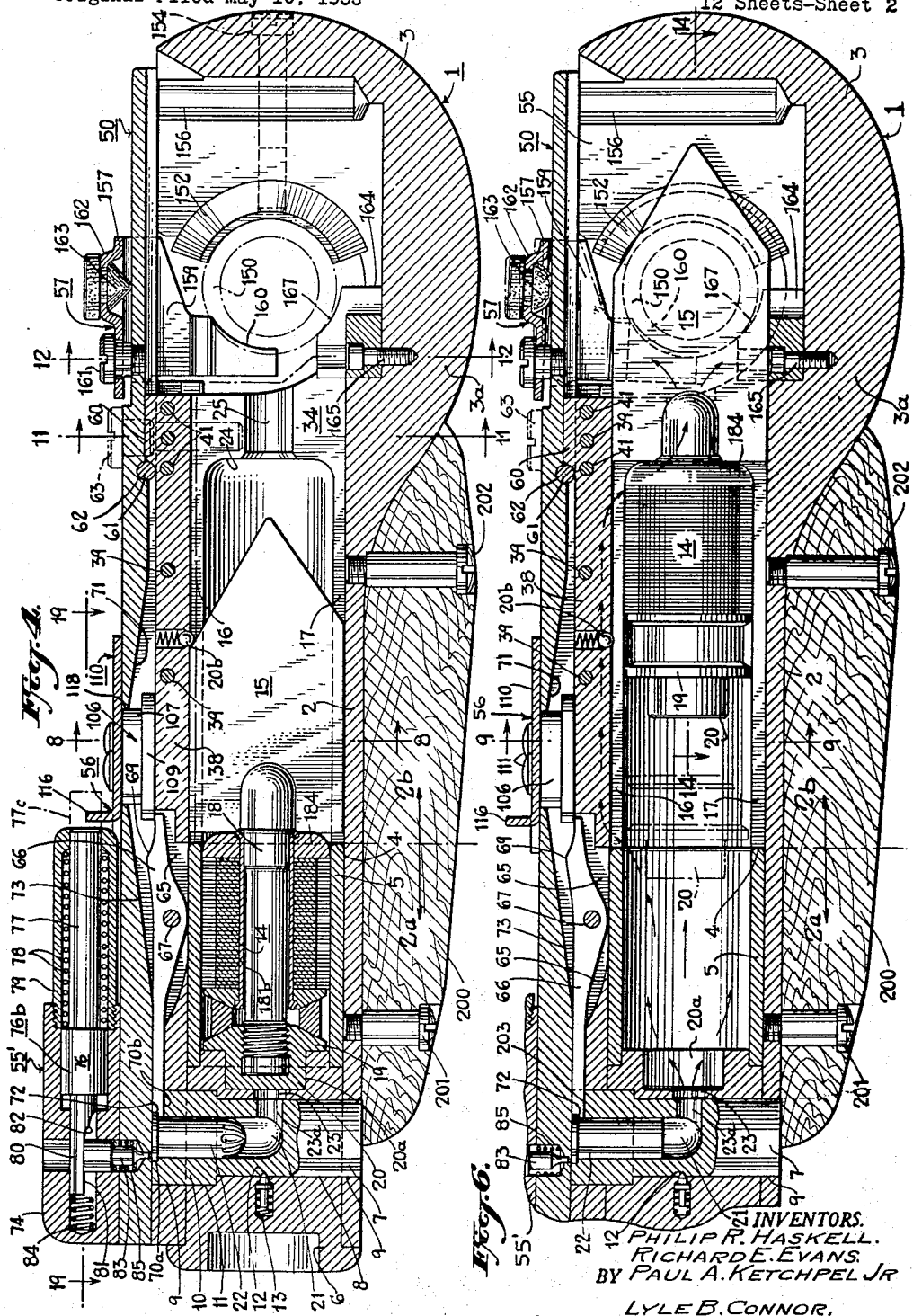

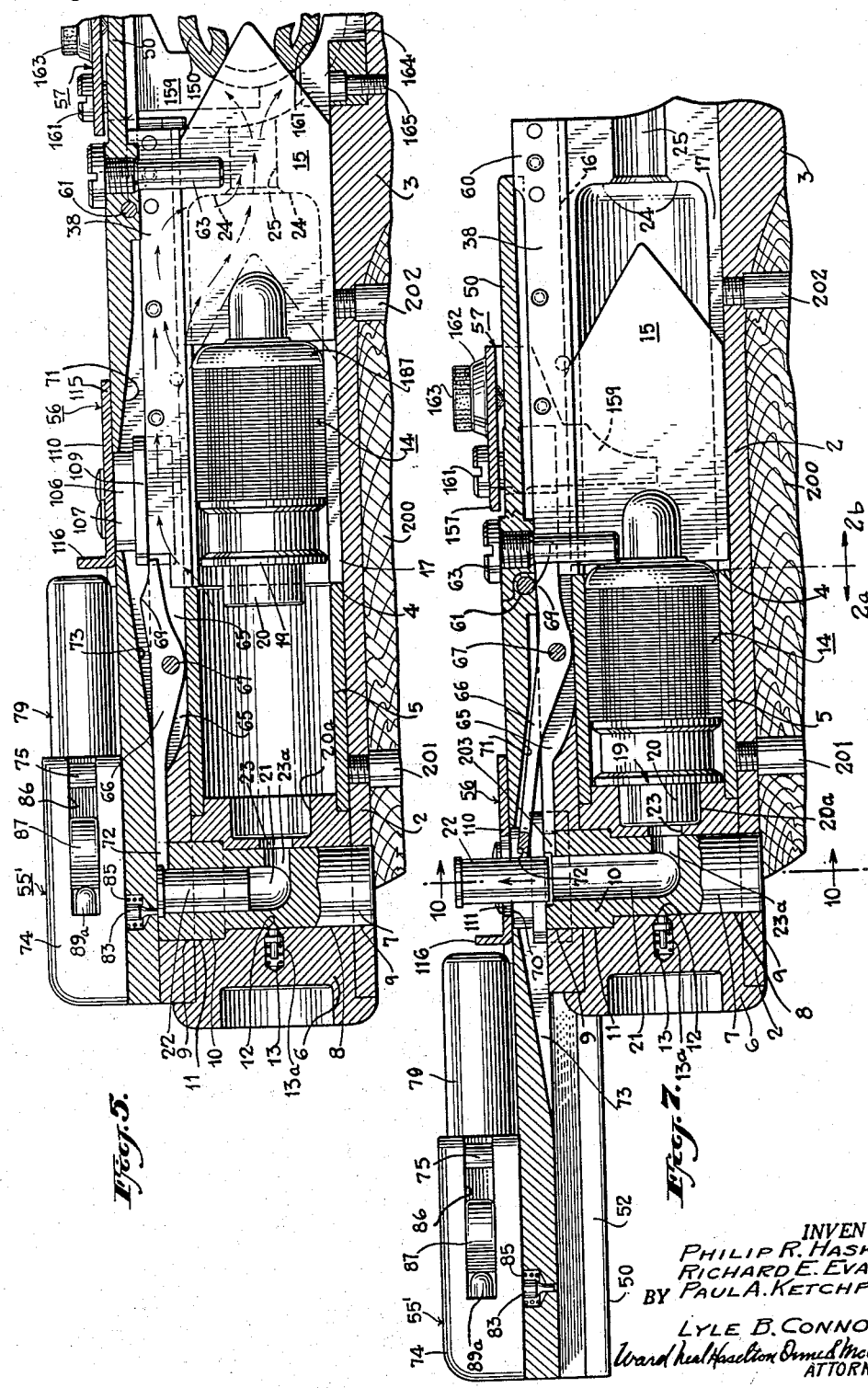

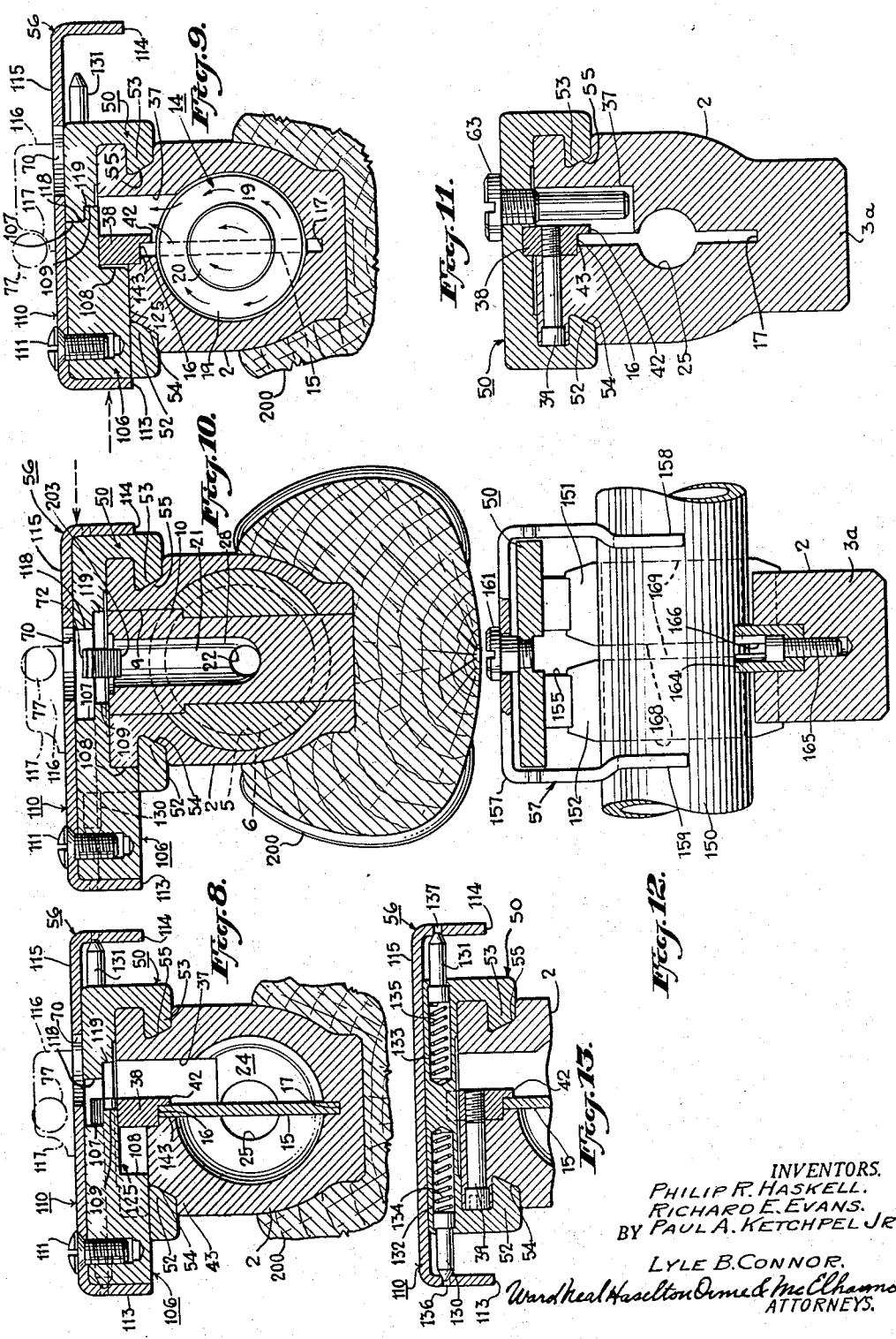

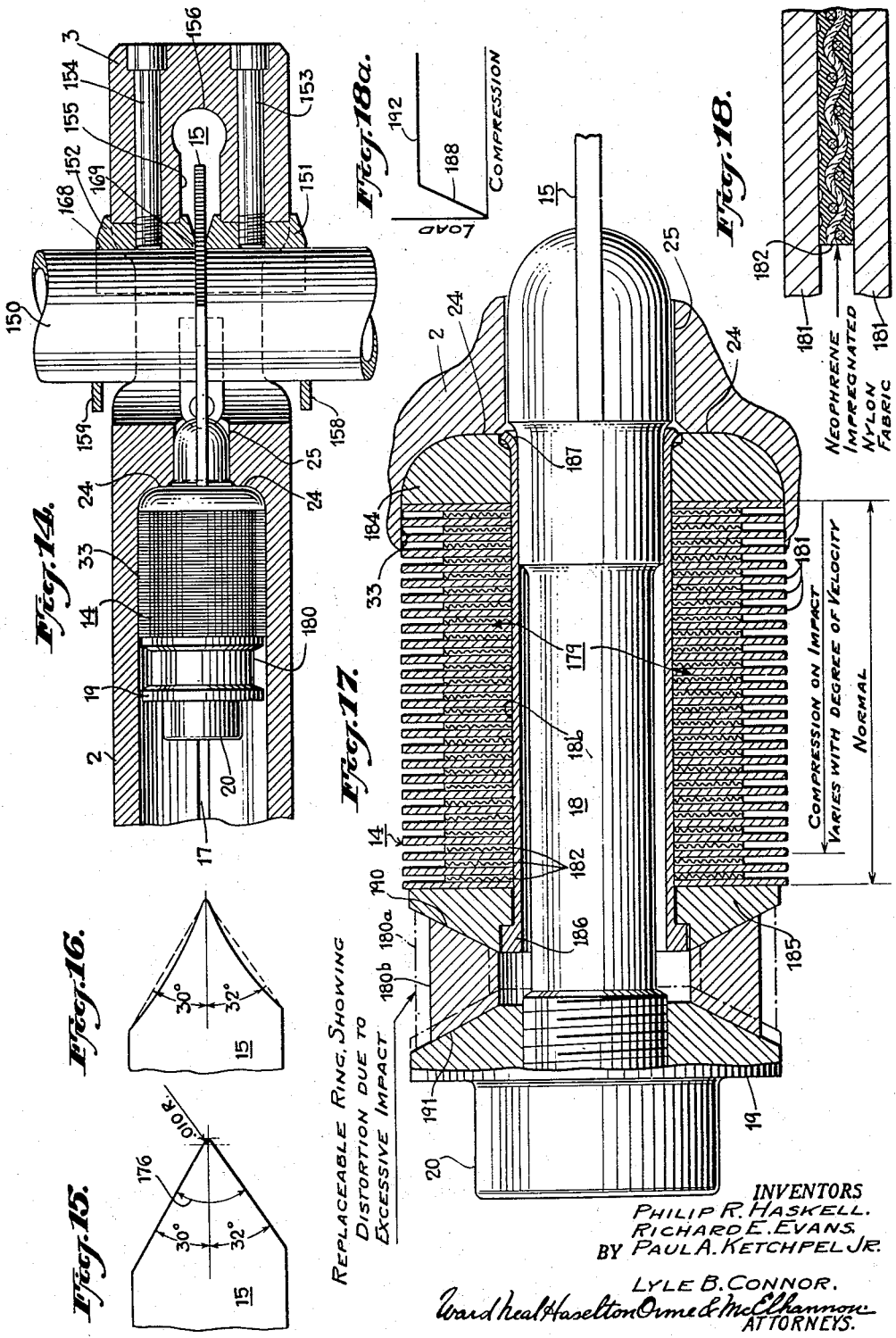

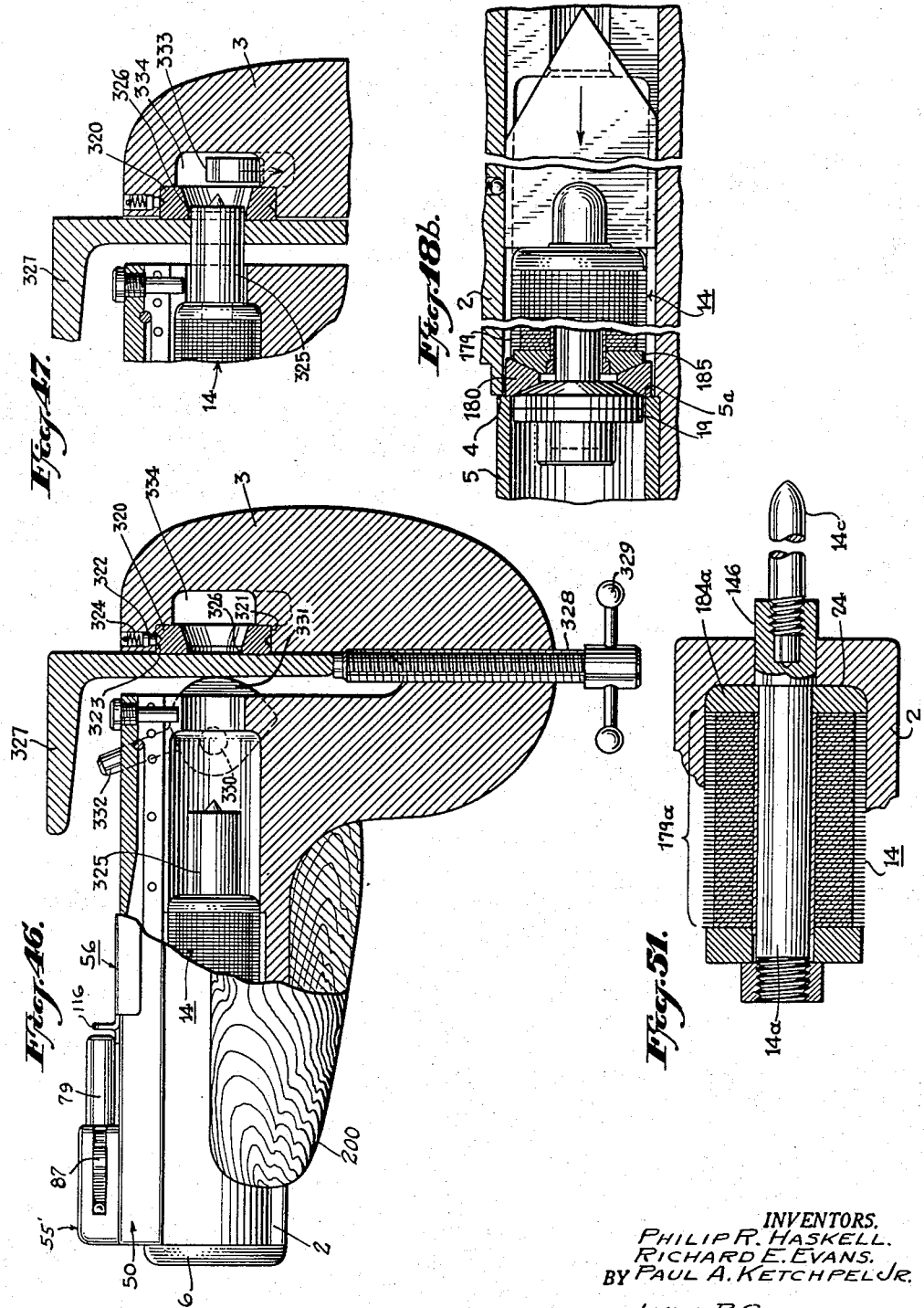

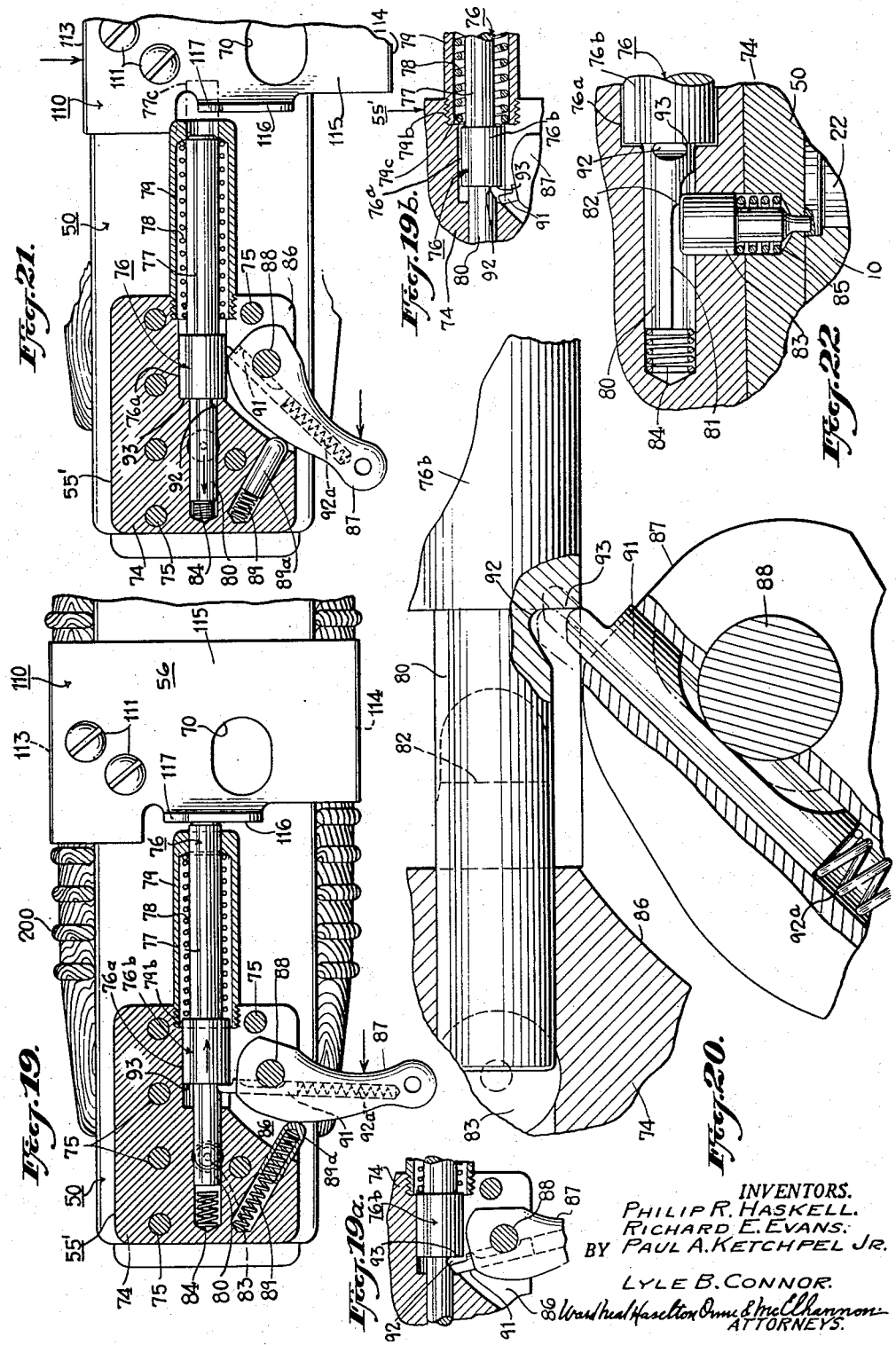

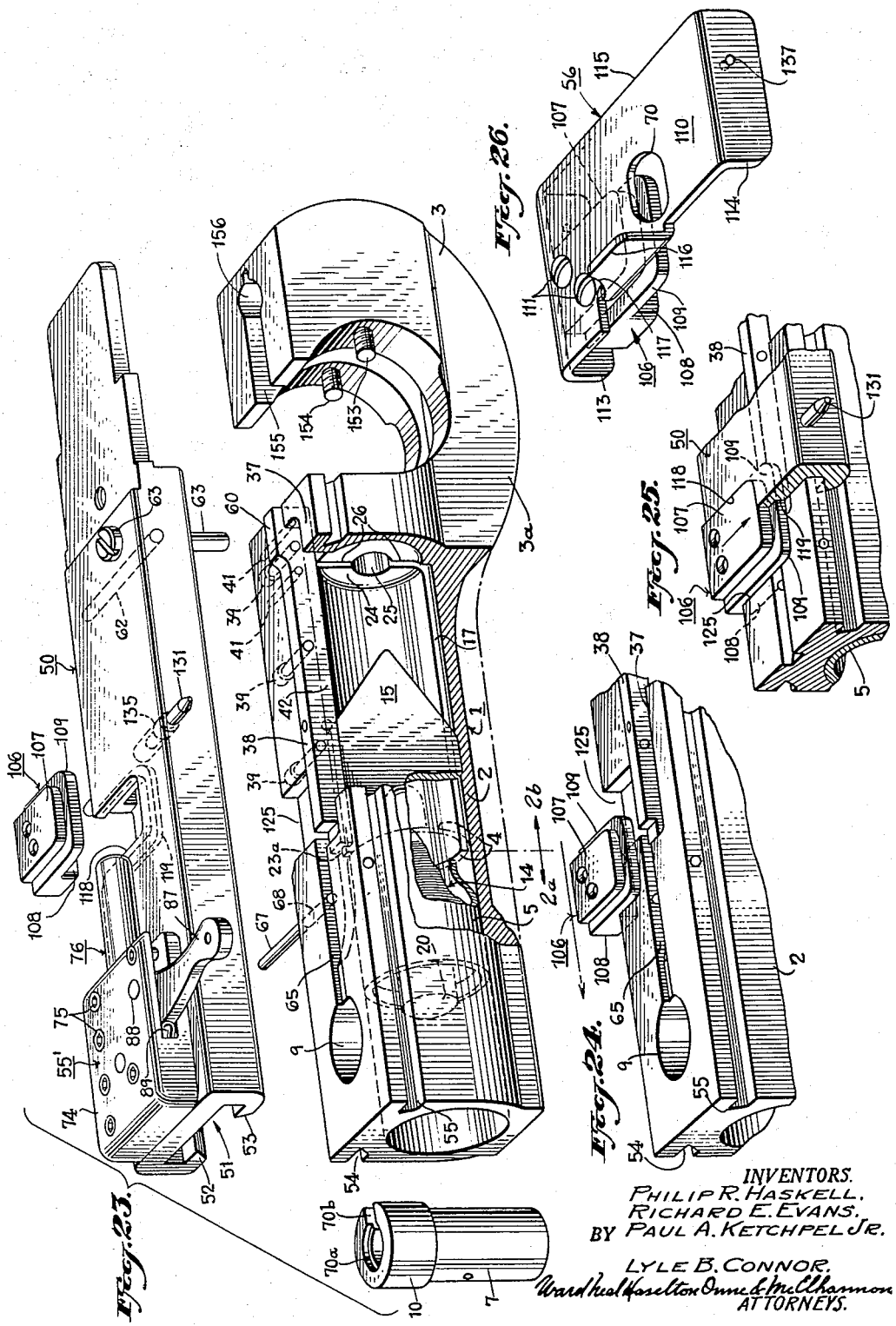

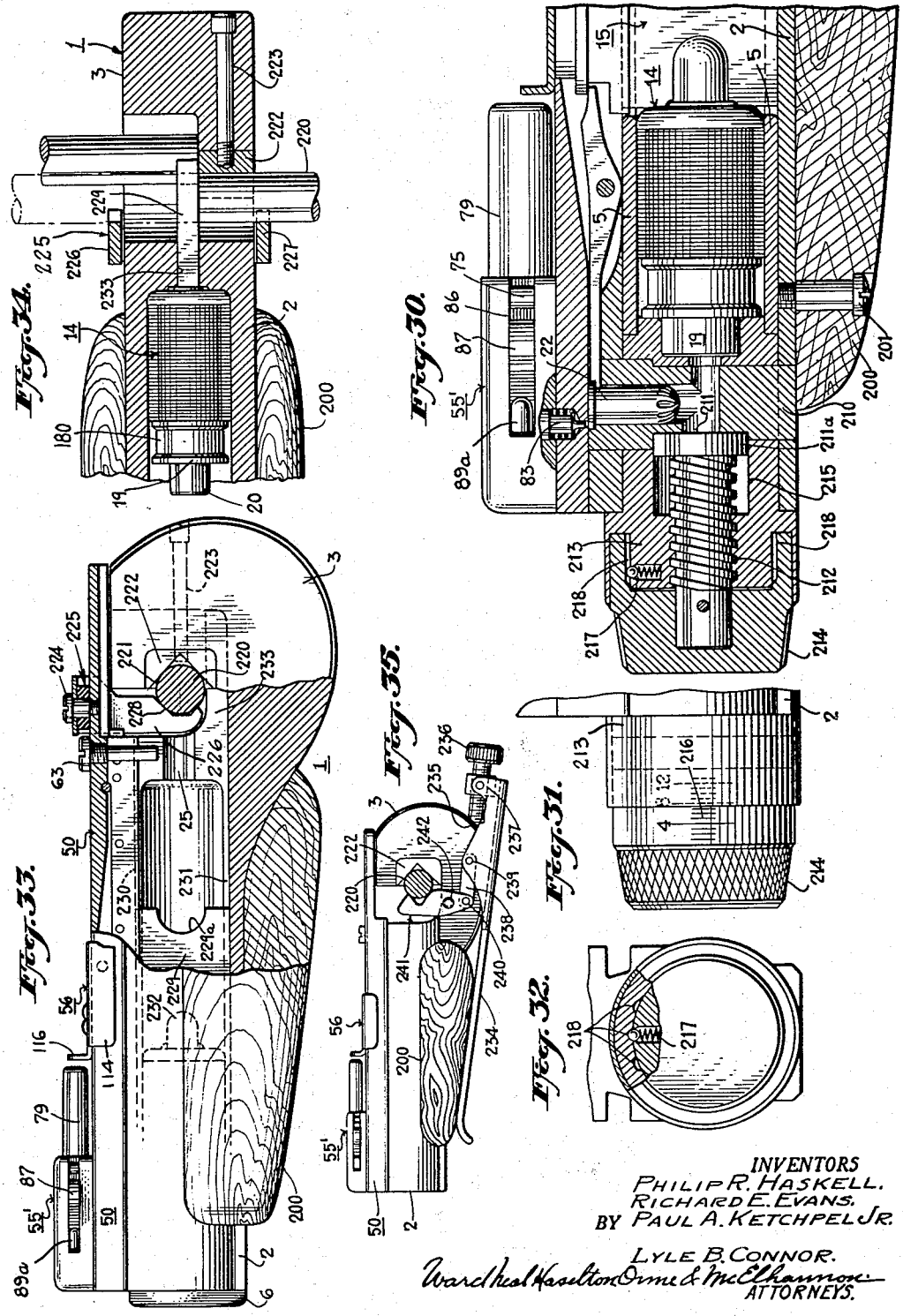

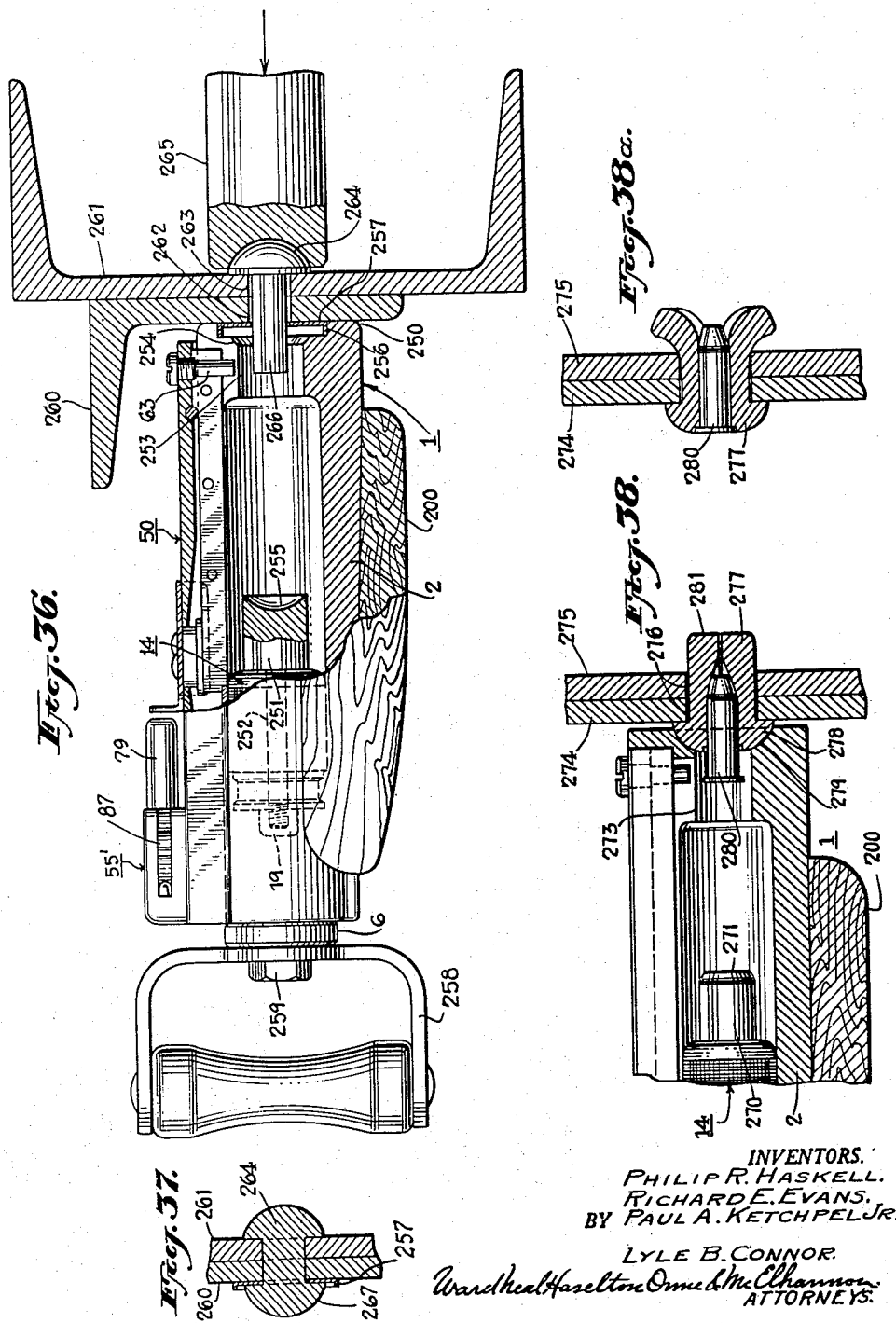

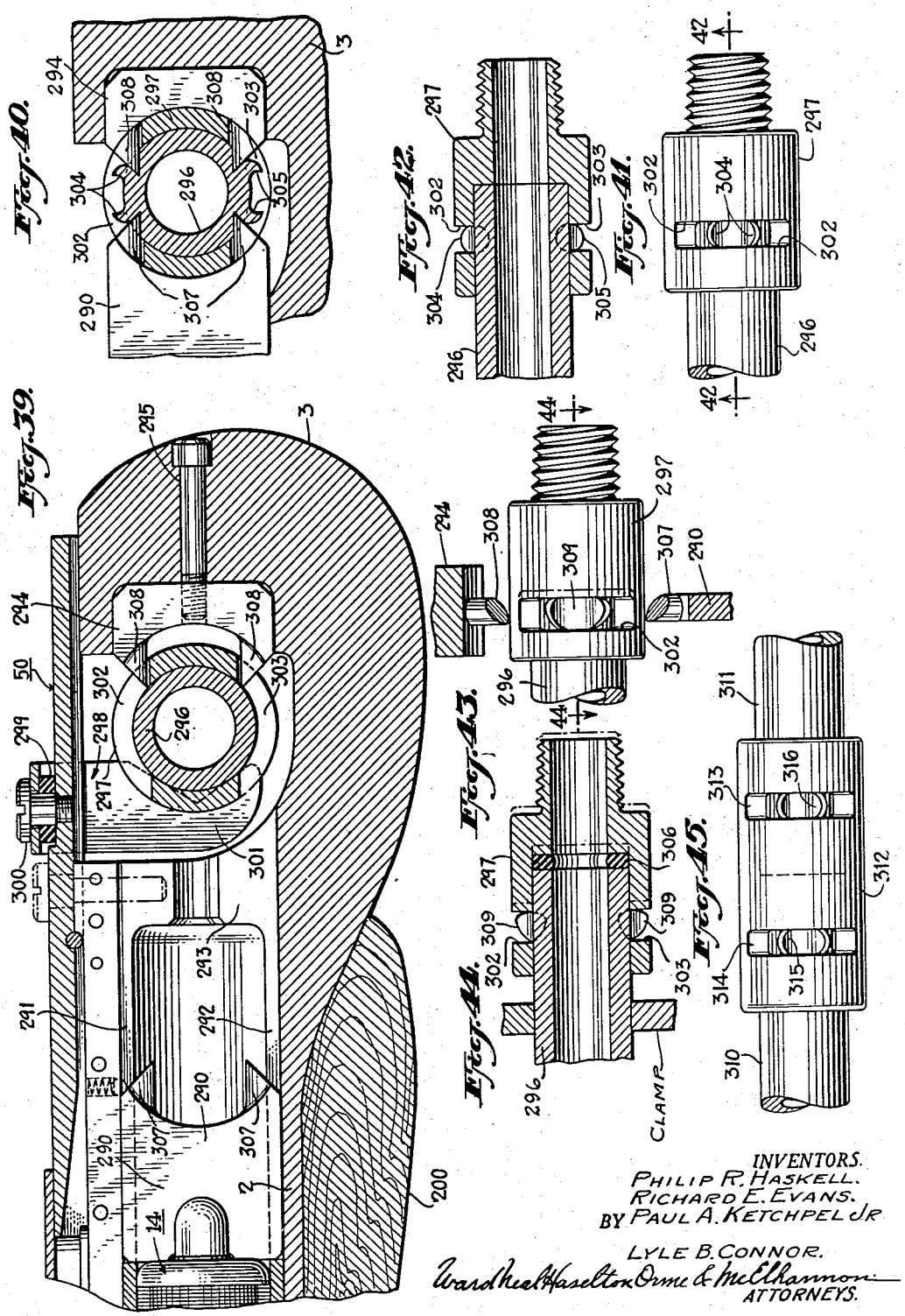

3,024,531
CARTRIDGE-POWERED PISTON TYPE TOOL

Philip R. Haskell, Fairfield, and Richard E. Evans, Southport, Conn., Paul A. Ketchpel, Jr., West Englewood, N.J., and Lyle B. Connor, Westport, Conn., assignors to Remington Arms Company, Inc., Bridgeport, Conn., a corporation of Delaware
Original application May 10, 1955, Ser. No. 507,281. Divided and this application July 26, 1957, Ser. No. 674,533
14 Claims. (Cl. 30—272)

This invention pertains to improvements in explosively actuated or cartridge powered tools, and provides a tool of this type of unique construction which is characterized by extreme compactness, lightness in weight and ease of manipulation with a minimum of effort, and which furthermore is substantially foolproof.

This application is a division of our copending application Serial No. 507,281, filed May 10, 1955.

In its various modifications the tool of the invention is adapted for performing a wide variety of work functions, such as the cutting of conduit, bar stock and heavy cable, etc., the punching of holes, riveting, the swaging of terminals or sleeves on electrical cables for terminating or uniting the same, the uniting of electrical conduit sections by means of an interposed coupling member, as well as the securing of threaded members on electrical conduit terminations, etc.

The tool of the invention comprises in its essentials and in accordance with a preferred modification, an elongated frame member of steel comprising a tubular or barrel section terminating at one end in a hook-like retainer arm of substantially C-shaped configuration for mounting a work piece to be operated upon. Within the barrel section is slidably displaceable a piston which mounts on its forward end a work tool, such as a cutter blade, hole puncher, cable swager, riveting plunger, etc. The tubular section of the frame is of reduced aperture at its muzzle end to provide a shouldered impact face for arresting forward motion of the piston thereat. The muzzle end is, in addition, appropriately apertured for passage of the work tool therethrough to work engaging position with a work piece held in the retainer arm.

The breech end of the barrel section is closed by means of a barrel plug insertable therein, this plug having a flanged head which overlies the end of the frame thus to prevent incorrect or wrong-end-to assembly. The breech end of the frame as well as the barrel plug are transversely apertured and counterbored for insertion of a relatively massive cartridge chamber plug having an enlarged head which seats in the counterbore, thus again preventing incorrect assembly. This chamber plug contains a bore extending axially through the head for insertion of a cartridge, whereby the tool is cartridge chambered substantially at right angles to the barrel axis, a feature which permits of substantially shortening the effective length of the tool and eliminates the necessity for safety precautions such as are otherwise required in conventional constructions wherein the cartridge chamber is aligned with the barrel. The cartridge chamber has access to the barrel through a sidewall outlet and an aligned bore extending through the end of the barrel plug.

In the firing position the piston is disposed at the breech end of the frame barrel and against the barrel plug in a relatively short barrel sleeve which rests against a shoulder of the frame barrel and is held in position by the barrel plug.

Mounted adjacent the cartridge chamber opening is an elongated ejector, one end of which engages a slot in the upper face of the cartridge chamber plug for assuring proper alignment of the outlet passage thereof with the aligned barrel plug outlet passage aforesaid. This ejector is pivotally mounted on the frame and pivots between cartridge seating and ejecting positions.

The tubular section of the frame is longitudinally slotted along its upper outer sidewalls for slidable reception of a cover having downwardly extending and turned in sidewalls for lockingly engaging these grooves against the explosive action of the tool when fired. This cover, when appropriately assembled on the frame as noted below, is longitudinally displaceable between loading and firing stations. It mounts on its breech end a firing unit including a firing pin which, in the firing position of the cover, is disposed in alignment with the rim of a cartridge inserted in the cartridge chamber for firing the same. The firing unit also includes a firing hammer or bolt which is displaceable longitudinally of the cover. Mounted on the cover adjacent this hammer is a safety locking device, which takes the form of a cross slide member, and which prevents firing of the firing unit except when the cover is adjusted to the firing station and the cross slide adjusted thereat to a firing position. To this end, the cross slide includes a cam member which, when the cover is positioned at the firing station, is adapted to enter a cutout in the frame extending transversely inward from one side thereof. The cross slide is provided with a resilient plunger actuated centering mechanism which causes the cross slide cam partially to enter this cutout with the cover positioned at the firing station, thereby to prevent longitudinal displacement of the cover with respect to the frame. The cross slide mounts an upstanding shield which is normally positioned in the path of traverse of the firing bolt and thus prevents actuation of the firing unit. With the cover positioned at the firing station as aforesaid, the cross slide may be transversely adjusted to one limiting position wherein the cam thereon enters the frame cutout to the maximum depth, and in this position the shield is displaced from the path of the firing bolt whereby the firing unit may be actuated. In the opposite limiting position of the cross slide the cam thereon disengages the frame cutout whereby the cover may be actuated to the loading position.

Threaded through the cover is a bolt which extends through an elongated slot in the upper face of the frame, which bolt is positioned in the path of traverse of the piston, and serves to position the piston at the breech end of the frame barrel when the cover is actuated from its firing station to its loading station. At the firing station position of the cover, however, this bolt is longitudinally positioned beyond the impact face at the muzzle end of the frame and thus does not interfere with the forward traverse of the piston to the work piece engaging position. For removing the cover from the frame this bolt is unscrewed and withdrawn, whereby the cover may be slid endwise off the frame as a first step in the takedown operation.

Mounted on the under side of the cover is a cross pin which, on actuation of the cover from the firing to the loading station, engages a concave camming face on the cartridge ejector and thus tilts it to the cartridge ejecting position. The cover and cross slide are also provided with an appropriate aperture which, with the cover positioned at the loading station, exposes the cartridge chamber bore for cartridge insertion and ejection purposes. The under side of the cover is also provided with an inclined ramp which, on displacement of the cover from the loading to the firing station, seats the cartridge in the chamber cavity and also seats the ejector end of the ejector in the cartridge chamber plug slot above mentioned, thus assuring that the unit is in proper condition for firing when the cover is adjusted to the firing station.

The C-shaped retainer arm of the frame mounts appropriate bushings or dies for reception of a work piece, which is clamped in position with the cover adjusted to the firing station by means of a cooperating clamping device resiliently mounted on the muzzle end of the cover. Also the cover is of such length that when adjusted to the firing station, it covers the open C of the retainer arm and thus shields the operator against chips, etc., ejected from the workpiece on engagement of the work tool therewith.

The underside of the frame mounts an appropriate handle for gripping the tool in one hand while the other hand is employed to manipulate the cross slide safety device and also actuate the trigger of the firing unit.

In addition to the novel features of construction and operation of the tool above discussed, it embodies various other unique features which will be but briefly touched upon at this point and elaborated upon hereinafter.

One of the most important of these is a novel shock absorbing assembly mounted on the piston for preventing injury to the equipment on impact of the piston with the impact face of the frame, particularly if the tool is fired inadvertently with no workpiece mounted in the retainer arm. This shock absorbing mechanism comprises an elastically deformable member which is adapted to absorb the excess kinetic energy for stopping the piston at the impact face after the work tool has performed its function. The other is a plastically deformable member for absorbing such excess kinetic energy as cannot be taken up by the elastically deformable unit, and which comes into play particularly if the tool is fired with no workpiece mounted in the retainer arm. These two units are mounted in axial alignment on the piston so that the elastically deformable shock absorber absorbs the initial impact to its maximum extent whereupon the residue is absorbed by the plastically deformable component. The elastically deformable unit is of laminated construction and in its preferred embodiment, comprises an axially aligned assemblage of metal rings, preferably of steel, interleaved with which are other rings formed of fibrous material impregnated with an elastic polymer, preferably woven nylon fabric impregnated with neoprene.

Another novel feature resides in the termination of the rear end of the piston in a protuberance of relatively small bore as compared to the piston proper or barrel which protuberance seats, in the firing position, in a bore of substantially corresponding diameter formed in the inner end of the barrel plug and which has access to the cartridge chamber through the outlet apertures of smaller bore above mentioned. This relatively small bore in which the protuberant piston terminus seats, is of such diameter and length as to assure complete burning of the powder charge before this piston protuberance passes out of the conforming barrel plug bore, and thus assures that the powder charge will not "snuff out."

Having thus described the invention in general terms, reference will now be had for a more detailed description of the construction and additional novel features of the invention, to the accompanying drawings wherein:

FIGURE 1 is a top plan view of a tool in accordance with one modification of the invention adapted for the cutting of conduit; while FIGURE 2 is a similar view with the cover and appurtenant components removed. FIGURE 3 is a fragmentary plan view of the FIGURE 2 showing, with certain components added, as explained below.

FIGURE 4 is a longitudinal sectional elevation through the entire tool assembly as taken at 4—4 of FIGURE 1, and showing the tool in condition for firing.

FIGURES 5 and 6 are views similar to FIGURE 4, but subsequent to firing and showing the advance of the piston and cutter assembly in successive stages to the cutting position.

FIGURE 7 is a partial showing, similar to FIGURE 4, but illustrating the tool in the cartridge ejecting or loading condition.

FIGURES 8–12, inc., are transverse sectional elevations as taken respectively at 8—8 of FIGURE 4 and FIGURE 1, 9—9 of FIGURE 6, 10—10 of FIGURE 7, 11—11 of FIGURE 4 and 12—12 of FIGURE 4.

FIGURE 13 is a sectional detail as taken at 13—13 of FIGURE 1.

FIGURE 14 is a fragmentary sectional plan view as taken at 14—14 of FIGURE 6.

FIGURES 15 and 16 are fragmentary views in side elevation of the cutting element, showing various preferred profile configurations thereof.

FIGURE 17 is an enlarged longitudinal sectional view of the piston assembly showing in detail the shock absorbing and safety feature constructions; while FIGURE 18 is an enlarged fragmentary sectional detail showing two of the steel shim laminae and interposed neoprene-impregnated nylon fabric laminae of the shock absorbing assembly of FIGURE 17.

FIGURE 18a is a graph idealizing the load-compression characteristics of the shock absorbing constructions of the FIGURES 17 and 18 showings.

FIGURE 18b is a fragmentary, axial sectional elevation of a modified form of the piston and frame assembly illustrating the action of the safety feature of the shock absorbing assembly in disabling the tool when fired in the absence of a workpiece.

FIGURE 19 is a sectional plan view of the firing unit in the firing position as taken at 19—19 of FIGURE 4. FIGURES 19a and 19b are enlarged, fragmentary sectional details of the FIGURE 19 showing. FIGURE 20 is an enlarged sectional detail similar to a portion of FIGURE 19, but showing the positioning of the firing mechanism just prior to release of the firing bolt or hammer. FIGURE 21 is a view similar to FIGURE 20 but showing the positioning of the mechanism immediately following the firing. FIGURE 22 is an enlarged longitudinal sectional detail showing actuation of the firing pin by the hammer at the instant of firing.

FIGURE 23 is an exploded perspective view of certain components of the tool assembly, namely, the frame and piston assembly, frame cover, cross slide cam and cartridge chamber members, with a portion of the frame broken away to show the interior construction and assembly.

FIGURE 24 is a fragmentary detail in perspective showing a portion of the frame and the cross slide cam in one position of adjustment; while FIGURE 25 is a somewhat similar view showing the cross slide cam in a second position of adjustment on the frame, this view also showing a portion of the cross slide cover.

FIGURE 26 is a perspective view of the cross slide and cross slide cover assembly.

FIGURES 27–29, inc., are transverse sectional details illustrating the cutting and shearing action of the cutter blade in severing the conduit.

FIGURE 30 is a longitudinal sectional elevation of the breech end of the tool, similar to FIGURE 4, but showing a modification of the cartridge chamber for varying the explosive action from a standard cartridge.

FIGURE 31 is a detail in side elevation of the adjusting knob shown in section in FIGURE 30; while FIGURE 32 is an end view of the adjusting knob of FIGURE 31 with a portion broken away to illustrate suitable detent indexing means for positioning the knob at various settings.

FIGURE 33 is a side elevation of a modification of the invention employed for the shearing of bar stock. FIGURE 34 is a sectional plan view of the FIGURE 33 showing, with the piston and bar cutter shear advanced to the cutting position. FIGURE 35 is a side elevation of a modification of the FIGURE 33 showing, and illustrating a novel bar stock clamping device applicable thereto.

FIGURE 36 is a side elevation, partly in section, of a modification of the invention adapted for riveting work components together; while FIGURE 37 is a sectional detail of the resulting workpiece as riveted. FIGURE 38 is a fragmentary showing in axial sectional elevation of a further modification of the FIGURE 36 device adapted for the joining of workpieces by means of so-called "cherry" type riveting; while FIGURE 38a shows in sectional elevation the completed effect of such riveting procedure on the workpiece.

FIGURE 39 is a fragmentary longitudinal sectional elevation of a staking tool modification of the invention for staking a threaded pipe termination onto the end of a pipe section; while FIGURE 40 is a view in transverse section showing the completed staking operation. FIGURE 41 is an end plan view corresponding to the transverse section of FIGURE 40; while FIGURE 42 is an axial sectional elevation as taken at 42—42 of FIGURE 41.

FIGURE 43 is a plan view, partly in section, showing a modification of the FIGURE 39 staking operation for staking a threaded terminus to a pipe terminus with an interposed resilient gasket; while FIGURE 44 is a sectional plan view of the same as taken at 44—44 of FIGURE 43. FIGURE 45 is a plan view illustrating the joining of two conduit pipe ends with a coupling section by employment of the staking modification of the invention illustrated in FIGURE 39.

FIGURE 46 is a view in side elevation and partly in section of a modification of the invention adapated for punching holes in a workpiece; while FIGURE 47 is a detail in sectional elevation showing the completion of the operation.

FIGURE 48 is a view in side elevation and partly in section of a further modification of the invention employed for swaging a terminal lug onto the end of an electrical cable; while FIGURE 49 is a sectional plan view of the completed operation. FIGURE 50 is a plan view illustrating the application of the FIGURE 48 modification to the joining of two cable ends by a coupling sleeve by employment of a double swaging operation.

FIGURE 51 is a fragmentary axial sectional elevation of a further modification of the invention, adapted for the driving of studs and related fastening devices.

Referring to FIGS. 1–29, inc., of the drawings, the conduit-cutting modification of the invention shown comprises a frame, identified generally by numeral 1, consisting of a tubular frame portion 2 extending from the breech end 2a at the left to the muzzle end 2b at the right, and a C-frame extension (FIGS. 4 and 23) comprising a work support 3 in general longitudinal alignment with the frame portion 2 and connected therewith by a curved shank 3a. The breech end of the frame portion is of slightly enlarged bore as compared to the muzzle end of the frame portion 2 and thus provides a shoulder at 4, FIGS. 4 and 23, against which a relatively short sleeve barrel 5 is held by means of a barrel plug 6, FIG. 4, inserted in the breech end of the frame. In a modified form of the construction shown in FIG. 18b, the forward end of the barrel sleeve 5 supplies a forwardly facing shoulder 5a for a purpose to be described below with reference to said FIG. 18b. The barrel plug is locked in the position shown by a cylindrical cartridge chamber plug 7, which extends transversely of the barrel axis through suitable holes 8, 9 drilled in the barrel plug 6 and the breech end 2a of the frame portion 2, respectively. The cartridge chamber plug 7 is provided with an enlarged head 10 which seats in a counterbore 11 of the barrel plug, thus to maintain the assembly locked in position as shown in FIGS. 4–7.

The mouth of the chamber plug is radially slotted to receive an ejector (to be described), and to locate chamber plug 7 in proper longitudinal and radial position in the bores 8, 9, the cylindrical wall of the plug is notched for reception of a detent pin 12, backed by a small compression spring 13, mounted in an axial bore 13a of the barrel plug 6.

In the firing position shown in FIG. 4, a piston 14 is slidably disposed in the sleeve barrel 5, and to which is secured a cutter blade 15 positioned in advance of the piston in the frame portion of smaller inside diameter. The cutter blade is slidable in grooves 16, 17 extending along the upper and lower portions of the frame barrel, these grooves being formed as explained below.

The cutter assembly 15 shown as a cutter blade is secured to or formed integral with a shank 18, which extends through a central sleeve member 18b of the piston 14 and is secured to the piston by means of a piston cap 19 threaded onto the breech end of the shank 18. This piston and cutter assembly will be described more in detail, infra.

For purposes above noted, to be explained in detail below, and as shown in FIG. 4, the breech end of the piston cap 19 terminates in a protuberant extension 20 of considerably smaller diameter than the piston 14, which extension in the action or firing position, rests in a conforming bore 20a drilled in the inner end of the barrel plug 6.

Also in the action or firing position of FIG. 4, the piston and cutter blade assembly 14, 15, is resiliently held in place by means of a resiliently mounted detent 20b which engages the upper edge of the cutter blade as shown.

The cartridge chamber plug 7 has formed in the upper portion thereof a bore 21 for insertion of a blank cartridge, as at 22, the cavity below the cartridge forming an explosion chamber which has access through aligned openings in the sidewall of the chamber plug and the forward end of the barrel plug, as at 23a, 23, to the bore 20a of the barrel plug.

Thus when the cartridge is fired, the piston and cutter assembly 14, 15, is impelled progressively forward as illustrated in FIGS. 5 and 6, until the pointed end of the cutter blade has advanced to the position shown in FIG. 6 to sever the conduit as discussed, post. The piston and cutter assembly is thereupon brought to rest by engagement of the forward end of the piston 14 with a shouldered impact face 24, FIGS. 2, 4, 7 and 23, of conforming configuration formed at the muzzle end 2b of the tubular frame section 2, at which the bore is tapered to an outlet passage 25 of relatively small bore through which the explosion gases escape as explained below. The muzzle end of the frame is also vertically slotted, as at 26, FIG. 23, to permit advance therethrough of the cutter blade to the conduit cutting position of FIG. 6.

The tubular frame section 2 is longitudinally slotted through its upper surface as at 37, FIGS. 2, 8, 9, 11 and 23, this slot being offset somewhat from the axis of the frame, as shown. Mounted in this slot and partially closing the same is an insert member 38, FIGS. 3, 4, 8, 9, 11 and 23, which is positioned in engagement with one side of the slot 37 as shown. This insert member is secured to the frame by means of screws as at 39, FIGS. 3, 11 and 23, which extend through holes 40, FIG. 2, in the sidewall of frame 2 and into threaded engagement with the insert member 38, thereby clamping the insert member to the frame. For additional strength the screws 39 are supplemented by dowel pins 41, which also extend as shown in FIGS. 3 and 23, through the sidewall of the frame section 2 and into suitable apertures provided in the insert member 38, these dowels frictionally engaging the frame and insert member in a tight fit.

The insert member 38 is of substantially rectangular cross section, as shown in FIG. 8, except for a depending flange 42, whereby the insert and the oppositely disposed surface portion 43 of the frame 2 provide a longitudinally extending grooved recess 16 in which the upper edge of the cutter blade 15 is slidably guided. Diametrically opposite to the grooved recess 16 thus provided, there is also machined in the frame 2 a corresponding groove 17, for slidably guiding the lower edge of the cutter blade 15.

As most clearly shown in FIG. 23, the frame 1 is provided with a cover or carriage 50 having in end view, as at 51, a relatively flat C-shaped configuration, with turned in lower lateral edges, as at 52, 53. The frame section 2 is correspondingly grooved along the upper edges of its opposite outer sidewalls, as at 54, 55, whereby the cover may be slid endwise onto the frame in vertically locking engagement therewith, as shown in transverse section in FIGS. 8–10.

Mounted on the breech end of the cover is the firing unit 55′, FIGS. 1 and 4. Mounted adacent thereto is the cross slide protective device 56 which is transversely adjustable to locking, ejecting and firing positions, and which prevents firing except when adjusted to the position last mentioned. Resiliently mounted on the muzzle end of the cover is a clamping device 57 which clamps the conduit to be cut in the C terminus or work support 3 of the frame when the cover is longitudinally positioned with respect to the frame as shown in FIG. 4.

For limiting the forward displacement of the cover 50 with respect to the frame 1, the insert 38 is provided with a raised portion or shoulder 60 at the muzzle end of the frame section 2, FIGS. 4 and 23. When the cover is advanced to the position of FIG. 4, this shoulder is engaged by a pin 61 extending transversely along the under side of the cover 50, and mounted in a bore 62, FIGS. 1 and 23, drilled through the sidewalls of the cover.

For returning the piston 14 from the impact face 24 of the frame barrel 2, against which the piston rests after firing as above explained, a piston return bolt 63 is tapped vertically through the cover as shown in FIGS. 4, 5, 11 and 23, with the lower end of this bolt projecting into the slot 37 of the frame for a sufficient depth as shown in FIGS. 5, 7 and 11, to engage the piston as the cover 50 is displaced to the left from the firing position of FIG. 4, to the cartridge ejecting position of FIG. 7. It will be noted, referring to FIGS. 4 and 23, that the slot 37 extends at the muzzle end of the frame barrel 2, beyond the piston impact face 24, and is thus protected from impact by the piston even if the shoulder 24 is set back by repeated impact. As piston return bolt 63 returns the piston 14 from its fired position, the end surfaces of piston cap 19 and extension 20 will compress the air within the bore of frame portion 2 and sleeve barrel 5, tending to force the air into cartridge chamber 21 through the bores 20a, 23 and 23a. When the cover 50 has been moved to the cartridge ejecting position, and causes ejection of the spent cartridge, as will be described, the air which has been compressed in the retraction of the piston by the breech slide acts to eject the loosened cartridge from the chamber.

Referring more particularly to FIGS. 2, 6 and 23, a shallow axially extending slot 65, is provided in the upper face of the frame section 2 near the breech end, in which is mounted an elongated cartridge ejector 66, which pivots on a pin 67 retained in a transverse bore 68 of the frame. The ejector 66 is actuated by displacement of the cover 50 as follows: As the cover is retracted from the firing position of FIG. 4 to the cartridge ejecting position of FIG. 7, the pin 61 mounted on the under side of the cover, engages a concave cam face 69 of the ejector and rotates it clockwise to the canted position shown in FIG. 7, to eject the cartridge shell 22, through an opening 70, FIGS. 1 and 26, formed in the cover of the cross slide 56. The under face of the frame cover 50 is provided with a sloping ramp, as at 71, to permit of this actuation of the ejector. With the cover in the position of FIG. 7, a new cartridge may be inserted through the cross slide opening 70, until the rim thereof engages the cartridge ejector end 72 of the ejector, whereupon the frame cover 50 is returned to the position of FIG. 4. As the cover is thus moved into position a second sloping ramp provided on the opposite under side of the cover, as at 73, engages the rim of the cartridge and seats it in the cartridge chamber cavity 28 with the shell rim flush with the upper edge of the cavity as shown in FIG. 4, while at the same time returning the ejector 66 to the cartridge seating position of FIG. 4 as the frame cover pin 61 rides off the cam face 69. In order to provide for seating of both the cartridge shell 22 and the ejector 66 flush with the upper surface of the chamber plug 7, this surface is peripherally recessed, as at 70a and radially slotted, as at 70b, FIGS. 4 and 23, appropriately to seat the shell rim and ejector, respectively.

Referring to FIGS. 4 and 19–22, inc., the firing unit 55′ comprises a housing 74, secured to the frame cover 50, by means of screws 75. The housing is drilled for axially displaceable reception of a firing bolt or hammer 76 having an intermediate portion 76b of enlarged diameter which is slidably displaceable in the frame bore 76a and from one end of which extends a hammer terminus 77 of smaller diameter, sleeved through a hammer spring 78, housed in an open-ended sleeve-like retainer 79, the inner end of which is threaded to the housing as at 79b.

As shown more particularly in FIG. 19b, the interior diameter of retainer 79, is of sufficiently enlarged diameter as compared to the bore 76a in which the enlarged portion 76b of the hammer slides, as to form a shoulder 79c, which retains the inner end of the hammer spring 78 when the hammer is in the normal positions of FIGS. 19 and 19a.

From the opposite end of the enlarged hammer portion 76b, there extends a second hammer terminus 80 having a flat under face 81, FIG. 22, which terminates adjacent the enlarged hammer portion 76b, in a stepped cam face 82 for actuating a firing pin 83 in the manner illustrated in FIG. 22. Interposed in the housing bore between the end of the shank 80 and the bore terminus, is a relatively light spring 84 which is compressed in the firing movement of the hammer and thereafter returns the hammer to normal uncocked position with the shouldered end of hammer enlargement 76b contacting the spring 78 at the housing abutment 79c, as seen in FIG. 19b.

As shown in FIG. 4, the flat under face 81 of the terminus 80, normally bears against the enlarged head of the firing pin 83, which latter is positioned in a bore extending through the housing 74 and into the frame cover 50. The lower end of the firing pin is of reduced diameter as shown and sleeves through a firing pin spring 85, which is retained in position between the enlarged head of the firing pin and the reduced diameter base of the frame cover aperture, through which the tapered lower end of the firing pin extends into engagement with the rim of the cartridge 22, when the tool is loaded in the manner illustrated in FIG. 4.

The housing 74 also mounts in a laterally extending slot 86 thereof, FIG. 19, a trigger 87, which projects horizontally from the housing, FIGS. 19–21, inc., the trigger being pivotally mounted on a pin 88 extending through the housing 74 and spanning the slot 86. The trigger is normally maintained in the position of FIG. 19a, by a compression spring 89, FIG. 19 disposed in a bore of the housing, and bearing at its opposite ends against the housing and a cup-like retainer sleeve 89a, slidable within the housing bore, and the closed end of which bears against the trigger, as shown.

Slidably mounted in a bore of the trigger is a sear 91, having a narrowed, finger-like upper end, which normally engages a notch 92 with a slight clearance as shown in FIG. 19a, this notch being formed in the side of the hammer terminus 80 adjacent the shoulder 93 of the enlarged diameter hammer or intermediate portion 76b. The sear is normally retained in the position of FIG. 19a, by means of a compression spring 92a, disposed in a trigger bore beneath the lower end of the sear, as shown.

Referring to FIGS. 19–21, inc., as the trigger is gripped and rotated clockwise about its pivot point 88, against the restoring action of the compression spring 89, the upper end of the sear engages the hammer shoulder 93 and forces the hammer to the right against the compressive restoring action of the spring 78, until the position assumed is about that shown in FIG. 20, at which point the hammer shoulder 93 overrides the rounded upper end of the sear and thus depresses the sear against the restoring action of the sear spring 92a, thereby permitting the bolt to be snapped smartly to the left by the restoring action of the hammer spring 78, in the manner shown in FIG. 21. As the hammer is thus snapped to the left, the flat under face 81 of the termnius 80 rides along the head of the firing pin until it is engaged by the camming surface 82, which abruptly depresses the firing pin to fire the cartridge in the manner shown in FIG. 22. Overcarry of the hammer 76 compresses the hammer return spring 84, as shown in FIG. 21, which immediately restores the hammer to the position of FIG. 19a, whereupon the momentarily compressed firing pin spring 85 returns the firing pin 83 to the position of FIG. 4, in engagement with the flat under face of the hammer terminus 80.

Considering now the cross slide protective device 56, the construction is best shown in the perspective views of FIGS. 23–26, inc., the assembly comprising a cross slide camming member shown generally at 106, and embodying upper and lower substantially rectangular cam portions 107, 108, the upper portion 107 projecting beyond the lower portion 108, and being provided with a flanged base 109. Referring to FIG. 26, the cross slide assembly also includes a cross slide cover 110 which is secured to the cross slide by two screws 111 passing through apertures in the cover 110 and threading into the member 106. The cover 110 comprises a relatively thin metal strip, the opposite ends of which are bent downwardly as at 113, 114, substantially at right angles to the main or body portion 115. The cover is also cut to such shape as to provide a lug 116 integral with the left edge thereof, which lug is bent upwardly substantially at right angles to the body portion, to provide a shield which prevents actuation of the firing mechanism or unit 55', except when the cross slide is adjusted to the firing position, as explained below. To this latter end, the lug 116 is provided at one end with an arcuately shaped cutout portion 117.

As shown in FIG. 23, the frame cover 50 has extending from one side thereof a substantially U-shaped cutout portion 118 for slidable reception of the cross slide camming member 106. This cutout 118 is undercut along its lower edge as shown at 119, to form guideways for the flanged portion 109 of the member 106. The cutout 118 is located adjacent the exposed end of the hammer 76, in the relative relationship illustrated in FIGS. 1, 4 and 23. In addition the frame section 2 has formed in its upper face, a substantially rectangular cutout portion 125, which extends transversely inward from one sidewall thereof, to a depth corresponding to that of the lower camming portion 108 of the cross slide 106, and which is adapted slidably to receive the same. The frame cutout 125 is located substantially the same distance from the breech end of the frame section 2 as is the cover cutout 118 with respect to the breech end of the cover 50.

Thus when the frame cover 50 is longitudinally positioned on the frame section 2, with the breech end of the cover aligned with the breech end of the frame, as shown in FIG. 4, the cover cutout 118 will be positioned above the barrel cutout 125, whereby the cross slide may be slid into the position shown in FIG. 25, in which the upper camming portion 107 penetrates the cover cutout 118 to the extreme depth thereof, and the lower camming portion penetrates the barrel cutout 125 to the maximum depth thereof. In this position, therefore, the cross slide camming member 106 locks the frame cover 50 against longitudinal displacement with respect to the frame.

If now the cross slide camming member 106 is partially withdrawn until the inner surface of the lower cam portion 108 clears the sidewall of the frame section 2, as shown in FIG. 24, the frame cover 50 may then be slid longitudinally with respect to the frame. In this position of partial withdrawal of the cross slide camming member 106, the upper cam portion 107 is still slidably positioned partially within the cover cutout 118.

The cross slide cover 110 is of such width as to permit these limiting transverse adjustments of the cross slide 106, in the manner and for purposes best illustrated in the transverse sectional views of FIGS. 8–10, inc. In FIG. 9 the cross slide camming member and cover assembly 106, 110, is adjusted to the full depth of the frame cover and frame cutouts 118, 125, whereby the cross slide locks the frame cover 50 against longitudinal displacement with respect to the frame 2. In FIG. 10, on the other hand, the cross slide and cover assembly is adjusted to the position that the lower cam portion 108 of the cross slide clears the sidewall of the frame section 2, as shown, whereby the frame cover 50 may be longitudinally displaced with respect to the frame. It will be noted that the limiting transverse adjustment of the cross slide and cover assembly in this direction, is determined by the width of the cross slide cover 110, this limiting adjustment being effected by engagement of the turned down end 114 of the cover with the right hand side of the frame cover 50, in the manner illustrated in the FIG. 10 showing.

It will now be observed by reference to FIG. 9, that with the cross slide adjusted to the position of maximum penetration into the frame cover and frame cutouts 118, 125, the upstanding lug 116 on the cross slide cover has been laterally adjusted to a position such that its arcuate edge 117, clears the path of traverse of the terminus portion 77 of the hammer 76, whereby, referring now to FIG. 4, the firing unit 55' may be actuated as a result of which actuation the terminus portion 77 of the hammer 76 is displaced from the shown position (full lines) to the position 77c (dot dash lines).

On the other hand, when the cross slide camming member has been adjusted to its opposite limiting position as shown in FIG. 10 in which, as explained, the frame cover 50 may be longitudinally displaced with respect to the barrel 11, the upstanding lug 116 on the cross slide cover is now positioned in the path of travel of the hammer 76, so that the firing mechanism cannot be actuated. In the FIG. 10 position of the cross slide camming member, the frame cover 50 may be drawn back for shell ejection purposes in the manner and to the extent illustrated in FIG. 7.

Referring now to FIGS. 1 and 13, the frame cover 50 has mounted therein beneath the cross slide cover 110, and extending from opposite sides of the frame cover, a pair of resiliently positioned plungers 130, 131, which tend to center the cross slide in the position shown in FIG. 13 and FIG. 8. To this end the frame cover 50 is provided with a pair of aligned holes 132, 133, in which are disposed, respectively, compression springs 134, 135, against which bear, respectively, the enlarged inner heads of the plungers 130, 131, these plungers being loosely swaged into the frame cover 50, with their outer tapered ends seated in holes 136, 137, drilled through the depending ends 113, 114, of the slide cover. Thus the cross slide cover will tend to be restored to the position shown in FIG. 13, by actuation of the plungers described, if the cover is manually displaced in one direction or the other.

Accordingly, if the cross slide camming member has been manually adjusted to the FIG. 10 position for withdrawal of the frame cover 50 to the shell ejecting position of FIG. 7, and is thereupon returned to the firing position of FIG. 4, the plunger assembly of FIG. 13 will cause the cross slide camming member to snap into the position shown in FIG. 1 and FIG. 8, when the frame cover 50 has been restored to the position that its cutout 118 becomes re-aligned with the frame cutout 125. It will be observed with reference to FIG. 8, that in this centered position of the cross slide cover 110, the lower cam portion 108 of the cross slide camming member has entered the frame slot 125, to about half the depth thereof, whereby the frame cover 50 is again locked in position to the frame barrel 2, to prevent longitudinal displacement with respect thereto. It will further be noted with reference to FIG. 8 that in this locked position of the frame cover on the barrel, the upstanding lug 116 on the cross slide cover is again positioned in the path of the hammer portion 77, thus to prevent actuation of the firing mechanism.

Referring more particularly to FIGS. 1, 2, 4, 14 and 23, the conduit 150 to be cut, is positioned in the hook-like retainer arm 3 of the tool frame, and against a pair of arcuate bushings 151, 152, these bushings being secured to the rear of the retainer arm by means of a pair of bolts 153, 154, which extend through the rear of the retainer arm and thread into the bushings. As shown in FIG. 2, these bushings are spaced apart slightly in excess of the width of the cutter blade 15 and the retainer arm or work support 3 of the frame is centrally slotted as at 155, FIGS. 2 and 23, for passage of the cutter blade in severing the conduit to the position illustrated in FIG. 6. This slot 155 terminates at the rear end of the retainer arm 3 in a vertical bore 156 from which the chips resulting from the severing of the conduit may be dumped by inverting the tool.

As above stated, there is resiliently mounted on the frame cover 50 at the muzzle end thereof, a clamping assembly 57, which includes a metal clamping member 157 of substantially U-shaped configuration viewed in end elevation, FIG. 12, and which spans the frame cover 50 and is formed at its opposite ends with turned down or depending arms 158, 159. These arms have the configuration, viewed in side elevation, best shown in FIG. 4, and are provided with arcuately curved lower front edges, as at 160, adapted to engage the surface of the conduit 150 and thereby force the same against the bushings 151, 152. The clamping member 157 is loosely secured to the frame cover 50 by means of a guard screw 161 which passes through an oversize central aperture of the clamping member, and is threaded into the frame 50. Adjacent the guard screw the clamping element is provided with a struck-up, apertured portion, as at 162, in which is mounted a resilient cushioning element 163 of rubber or equivalent, which rests on the top of the frame cover 50, and thus resiliently supports the clamping member 157 in spaced relation to the frame cover 50. As the frame cover is moved to the firing position of FIG. 4, the arcuate edges 160 of the clamping element arms 158, 159, engage the conduit 150 and force the same against the bushings 151, 152, and in so doing rotate the clamping element 157 clockwise about the axis of support provided by the guard screw 161, whereby the cushioning element 163 is flattened somewhat from the position of FIG. 4 to that of FIG. 6, thus resiliently clamping the conduit 150 in position in the manner shown in FIG. 6.

To further assist in the supporting and clamping of the conduit, there is mounted at the base of the frame arm 3, an arcuately surfaced segment member 164, held in position by a bolt 165 threading into the base of the frame arm 3, this segment being centrally slotted as at 166, FIG. 2, to provide passage of the cutter blade past the same. The arcuate face 167 of this segment supports the underside of the conduit in the manner best illustrated in FIG. 4. After the conduit is severed by the cutter blade in the manner illustrated in FIG. 6, retraction of the frame cover 50 of course, retracts the clamping element 157 along with it, thus to permit of inserting a new conduit section in the frame arm 3 to be cut.

Referring more particularly to FIG. 2, it is seen that the bushings 151, 152, are of symmetrical configuration, thereby providing cutting edges on both sides of each as at 168, 169, whereby these bushings may be inverted or reversed in position, thus to utilize the cutting edges on both sides of each. Bushings of differing arcuate curvature are provided for conduits of radically differing diameters to be cut, although it is to be noted in this connection that the arcuate contour of the bushings need only roughly approximate that of the conduit to be cut due to the clamping action of the clamping element 157 and the supporting action of the segment 164.

Referring to FIGS. 1 and 4, it will be observed that when the cover 50 is advanced to the firing position, the forward end of the cover covers the open "C" of the hook-like retainer arm 3, so that the cover is thus in this closure position whenever the conduit is to be severed. As thus closed the cover insures that the conduit cannot be half-in and half-out of the die bushings 151, 152, when the tool is fired. The frame cover 50 as thus closed automatically and safely covers the region into which the shear cutout conduit chips are thrown, and permits them to be dumped out when the cover is open. The operator is thus shielded against flying chips of metal.

Extensive experimental tests have shown that the thickness and profile of the cutter blade 15 have considerable effect on the cutting action, as regards severing of the conduit without denting. Referring to FIG. 16, these tests have established that for the cutting of steel conduit, the point of the blade should be of substantially V shape and should have an included angle 176 of substantially 60°. The thickness of the blade may vary with the character of the work support. Assuming a work support 151, 152 of the type shown in FIG. 4, the blade thickness for effective cutting without distortion may vary from about .05" to about .25", an optimum thickness being .06" to .07". Thicker blades are more durable but require greater driving force. They also have a tendency to distort tubular work, due to the radial outward flow of the tubular stock adjacent the point of entry of the blade. However, by providing a full 360° exterior work support, the blade thickness may be increased up to at least as much as 1", an appropriate driving force being provided. Referring to FIG. 15, the point of the blade may have a rake angle of 30° both above and below the median line, but preferably has a rake angle of about 30° above the median line and about 32° below the median line, as shown, for holding the blade down as it passes through the conduit. Referring particularly to FIGS. 3, 4 and 6, it will be seen that the lower blade guideway 17 is backed by the solid metal of the frame, while the upper edge of guideway 16 is defined by the filler strip or insert member 38 held in place by cross-pins. The flatter angle of the upper part of the blade point precludes any tendency of the blade to climb and distort the filler 38 or shear the fastening pins should the blade point impact the cylindrical surface of the workpiece above center. Our investigations have shown that blades having an included angle of up to 90° can be satisfactorily employed for the severing of steel conduit, and such blades having the 90° included profile angle have been shown to be most sturdy. However, for the severing of conduit made of materials like copper or brass, which have a galling or binding action on the blade, a blade having a double concave configuration such as that shown in FIG. 16 is most satisfactory to assure dent-free severing of the conduit. The cutting blade is preferably made of a chisel steel, such for example, as a relatively high carbon, low alloy steel containing, for example, about: 0.55% carbon, 1% manganese, 2.3% silicon, 0.5% molybdenum, 0.25% vanadium, balance iron except for the usual impurities, such as phosphorus and sulfur, within commercial tolerances.

The action of the cutter blade in severing the conduit is illustrated in FIGS. 27–29, inc. When the cutter blade first penetrates the cylindrical conduit, the line of contact is a short chord, so that a substantial part of the penetrating force is applied in a radially inward direction. The conduit is sheared at the two edges of the cutter, and the chips 170, 171 thus produced are pushed inwardly, as shown in FIG. 27. As the cutter point approaches the center of the conduit, the line of contact shifts from a chord to a radius, and the force becomes tangential. Thereafter, an increasing component of the force is outward, instead of inward. Accordingly, as the point of the cutter passes the center, chips 170a, 171a begin to form on the outside of the conduit. When the cutter point reaches the back of the conduit the force is applied outwardly and the chips 172, 172a which form at this point may be continuous with the chips 170a, 171a. In the meantime, the interior chips 170, 171, have been severed from the conduit, usually being caught, compressed and distorted between the shear blade and the interior face of the conduit, and finally expelled lengthwise of the conduit in two parts.

To insure that the work is cut completely through, it is necessary to impart to the piston and blade assembly an excess of say 25% of the energy actually required to sever the work or to perform other operations heretofore outlined, and to stop the movement of the piston and tool assembly after its work is completed, a buffer is associated with this assembly. In a preferred form of the invention, this buffer comprises two elements, the first being a stack of radially elastically deformable members and the second a "ring spring" type of assembly comprising one or more members which are radially elastically deformed and under excessive stress undergo a plastic deformation. Such excessive stress may be applied when the tool is inadvertently fired without a workpiece in place. Under these conditions the buffer assembly must absorb the entire kinetic energy of the piston and blade assembly, there being no other resistance to the forward movement of this assembly. The construction of the tool may be such that plastic deformation of the ring spring disables the tool, in a manner to be described, both indicating that the tool has been fired without a workpiece in place and necessitating replacement of the plastically deformable ring. As particularly shown in FIGS. 17 and 18, the elastically deformable shock absorbing component is identified generally by numeral 179 and the elastically and plastically deformable member by numeral 180. The function of the elastically deformable shock absorbing component 179 is to absorb the excess kinetic energy of the piston, over and above that required to sever the conduit when the tool is fired and the piston impeller thereafter against the impact surface 24 of the frame. The function of the plastically deformable member 180 is to absorb the excess kinetic energy of the piston on firing, which is not taken up in severing the conduit, and in elastic deformation of the shock absorbing member 179, such as occurs, for example, if the tool is inadvertently fired with no conduit in the retainer arm.

In order for the elastically deformable shock absorbing component 179 satisfactorily to perform its function above stated, it must be designed to meet two rigid requirements. First, the compression modulus of elasticity of this member must be such as to decelerate the piston without exceeding the tensile strength of the blade. In this connection it will be observed that upon impact of the piston against the frame impact face 24, tending abruptly to stop the piston, the inertia of the blade places the same under tension so that if the piston is stopped too abruptly, the cutter blade will fail in tension. Therefore the shock absorbing component 179 must have a modulus of elasticity which is sufficiently low as to decelerate the piston at a rate sufficiently low that the tensile strength of the cutter blade is not exceeded. The second requirement which the shock absorbing component 179 must meet is that it must be capable of supporting a compression load equal to the tensile strength of the blade. This is explainable as follows: As the front face of the piston impacts the frame impact face 24, the shock absorbing component becomes analogous to a compression spring, the rear end of which is connected to, and compressed by, the piston cap 19 threaded onto the terminus of the blade shank 18. The momentum of the blade is thus resisted by the force exerted by the spring as it is compressed. If this spring has too high a compression modulus, the blade will fail in tension. Metal springs even in coiled forms of low modulus, have nevertheless too high a compression modulus, and, being made of metal, a shock wave is built up that outraces the load velocity and "sets" the spring. On the other hand, solid plastics have too high a compression modulus, and, in addition, cannot withstand the compressive forces which their high modulus quickly produces. For example, leather approximates a satisfactory modulus, but fails in compression loading during repeated cycles, because its outer tough fibers break loose from their supporting matrix. Rubber and rubber-like material, including the synthetic rubbers such as neoprene, display a compression modulus somewhat under that of leather, so that considerably more stroke is required to store the same energy. While rubber and equivalent materials can withstand heavy loading with elastic recovery, they require support within a container both to raise their natural modulus and to prevent shredding failure under load. As thus compressed in a container, for example, in a steel sleeve, rubber behaves like an incompressible fluid, exerting tremendous hydraulic pressure on the surrounding container. The strength of the retainer thus required cannot be provided in a tool of reasonable size.

In accordance with one aspect of the present invention, this problem is successfully solved in a compact structure by making the elastically deformable component 179 of a laminated construction and consisting of a series of axially aligned metal rings 181, such as steel shims, which are interleaved with other rings 182 formed of woven fabric, preferably woven nylon fibers, which are impregnated with an elastic polymer, preferably neoprene. This laminated arrangement is assembled, in axial alignment as shown, on a steel assembly tube 18b between an impact plate 184 mounted on the forward end of the assembly tube and an annular spacer member 185 assembled on the rear end of the assembly tube. To facilitate this assembly, the assembly tube is formed with a flanged terminus 186 at its rear or left end in the drawing and the spacer member 185 is formed with a conforming axial counterbore, which seats against this shoulder. The assembly tube at its opposite end is crimped up against the impact plate 184 as at 187, thus to lock the entire assembly together.

In this assembly, in the elastic polymer-impregnated fabric rings 182, such as the neoprene impregnated woven nylon fibers, the fibers act as stay bolts to hold the elastic polymer or neoprene from expanding, and thus absorb the lateral strain on these rings resulting from impact of the piston against the frame impact face 24. Neoprene has been found to be a convenient elastic binder for nylon fibers, and thus facilitates the establishment of a synthetic modulus of elasticity which neither the nylon alone nor the neoprene alone can possess. The surface of the steel shims separating the layers of impregnated fabric are preferably roughened, as by sand-blasting. These shims frictionally support the fabric layers, giving added strength and retarding radial expansion; their friction against the fabric also dissipates a substantial amount of energy. When, as illustrated, the elastically deformable member 180 is used in conjunction with the shock absorbing component 179, the latter is of such length and construction as to sustain without plastic flow a compression substantially equal to that which will initiate elastic deformation of the member 180.

Referring to FIG. 18a, by appropriately dimensioning the elastic polymer impregnated fabric rings 182 in relation to the metal rings 181, the modulus of elasticity 188 of the plastically deformable member 180 may be sloped as desired within limits, thus to adjust the deceleration of the piston in accordance with the requirements above stated.

Because of the requirement that the piston weight be minimized, the amount of elastic shock absorption that can be built into the shock absorbing component 179, is limited, and the excess must be taken up by the plastically deformable member 180, both as regards excess kinetic energy resulting from the conduit severing operation, and more particularly as regards the excess kinetic energy resulting from inadvertent firing of the tool with no conduit mounted in the retaining arm. This latter is strictly a protective feature to prevent injury to the cutting blade, piston and the tool itself resulting from such inadvertent firing. To this end the plastically deformable member 180 comprises a ring made of a malleable metal like aluminum or an aluminum alloy of such dimensions that it will fail in compression before the other tool components will fail in tension. That is to say, the compression strength of the plastically deformable member 180 must be substantially less than the tensile strength of the tool frame, cutting element and piston. It will be noted in this connection that when the piston impacts the frame impact face 24, the tubular portion of the frame is placed under tension. Likewise, as above explained, the cutting element is placed under tension due to its inertia. As shown in FIG. 17, the plastically deformable member 180 of malleable metal is of trapezium configuration, as viewed in axial section, and is mounted between the spacer member 185 and the piston cap 19, both of which are made of a metal having a high elastic limit, such as steel. The abutting surfaces 190, 191, between the plastically deformable member 180 and the adjacent steel spacer and piston cap members 185, 19, are preferably sloped in accordance with the minimum slope or friction angle of the contiguous metals, i.e., aluminum vs. steel in the preferred modification as above mentioned, thus to enhance the energy absorption by the malleable metal plastically deformable member 180 as the latter is plastically deformed, and squeezed from the full line sectional area 180b to that of the dotted line 180a.

Thus the camming angles of the sloped surfaces 190, 191, approximate the friction angles between the contacting metal surfaces, so that the yield strength of the plastically deformable member 180, is mechanically increased by the friction. The plastically deformable member 180 shown, approximates a rectangular stress-strain diagram for maximum efficiency of energy dissipation as a function of piston stroke. The maximum force developed thereon accordingly never exceeds a value exceeding the tensile strength of the cutter blade and shank.

Referring again to FIG. 18a, the plastic deformation of the member 180 may be designed to occur at any given load level such as 192. As a result, therefore, of the composite assembly comprising the elastically deformable shock absorbing component 179 and the plastically deformable energy absorption member 180, the composite load compression graph thereof will be approximately as indicated at 188, 192 of FIG. 18a. That is to say, as the piston impacts the frame shoulder, the impact of the piston against the shoulder will at first be gradually absorbed by elastic deformation of the shock absorbing member 179, along the line 188 of FIG. 18a, until a load corresponding to the level 192 is reached, whereupon the additional load will be assumed by plastic deformation of the plastically deformable member 180 which holds the load substantially constant thereafter at the level 192 as shown in FIG. 18a.

It should be noted that in the ordinary usage of the tool the plastically deformable member 180 is not deformed beyond its elastic limit and that it is only in the event that the tool is operated without a workpiece in place that the stress applied to this ring is sufficient to plastically and permanently deform it. Under some conditions, it is desirable that such permanent deformation of the plastically deformable member 180 be indicated and disable the tool until such is replaced. This can be accomplished by providing that permanent deformation of the plastically deformable member 180 increases its diameter beyond the bore diameter of the barrel sleeve 5 in the manner illustrated in FIG. 18b. In this condition, when an attempt is made to retract the piston to firing position, the margin of plastically deformable member 180 engages the end 5a of the barrel sleeve 5, preventing complete retraction of the piston.

While the buffer above described comprises both an elastically deformable component 179 and a plastically deformable member 180, where space requirements permit, it is possible to so extend and enlarge the elastically deformable member 179, as to provide the energy absorption capacity needed for firing in the absence of a workpiece without the use of the plastically deformable member 180. Either arrangement is adapted to use in a stud driving tool, as distinguished from a cutting or swaging tool, the former is illustrated in FIG. 51, in which the tool shank 14a terminates in an enlarged end 146, recessed and threaded to receive the threaded shank of a stud 14c, which is designed to be fired into a difficulty penetrable material, such as aged concrete or steel. When such a tool is fired in the absence of work which will stop the stud after the desired penetration, the stud, instead of being projected into space, is retained by its threaded connection to shank 14a, the kinetic energy of stud, tool and piston being all absorbed in the buffer device 179a.

Reverting to FIGS. 17 and 18, while the elastically deformable component 179 is a buffer and preferably comprises layers of impregnated fabric alternating with metal shims, under some conditions it is possible to omit the shims and place successive layers of impregnated fabric in face-to-face relation. It is essential, however, that the buffer comprise a plurality of rings or disks of fibrous material held in an elastic impregnating medium such that the transversely disposed elastic fibers and the elastic impregnant interact to oppose radial deformation while enabling the required longitudinal deformation.

Reverting to FIG. 17, the piston impact plate 184 is likewise preferably made of a malleable metal like aluminum or an aluminum alloy, having a compression strength substantially below that of the metal of the frame 1, which latter is made of steel. The purpose of this is to assure that the impact plate will fail through compression before the steel frame is broken under tension, this being an additional safety precaution in the piston construction. Moreover, the stress incident to stopping the piston assembly, either in normal usage or in firing without a workpiece, is received by the main frame barrel 2, and not by the work support 3, thus avoiding any bending stress in the curving connecting shank 3a.

Reverting to FIGS. 1 and 4, the tool is provided with a handle 200 of wood, hard rubber or equivalent, which is assembled on the under side of the tubular frame section 2, by means of bolts, as at 201, 202, threaded into the frame.

In assembling the tool from its components, the piston and cutter assembly 14, 15 are first inserted in the frame barrel 2, with the upper end lower edges of the cutter blade aligned with the grooves 16, 17, in which the blade slides. The sleeve barrel 5 is thereupon inserted against the shoulder 4. Since the bore of the sleeve barrel 5 is less than that of the width of the cutter blade 15, it is apparent that the piston and cutter assembly 14, 15 must first be inserted, for this reason. The barrel plug 6 is then inserted in the breach end of the frame and the cartridge chamber plug 7 inserted in the aligned holes 8, 9, and rotated until the pin 12 of the barrel plug seats in the notch of the chamber plug. As thus positioned, the slot 70b, FIGS. 4 and 23, cut in the upper face of the chamber plug 7, is positioned to seat the ejector end 72 of the cartridge ejector 66.

The enlarged head of the barrel plug 6 assures that the proper end will be inserted in the frame barrel 2. The chamber plug cannot be inserted until the barrel plug has been rotatively positioned with its bore 8, in alignment with the frame bore 9. The chamber plug cannot be incorrectly inserted by reason of its enlarged head 10 which can seat properly in the barrel plug counterbore 11 only when the plug is inserted as shown in FIG. 4.

With the aforesaid components thus assembled as shown in FIG. 4, the cover 50 may then be slid into position on the frame, to effect which the piston return bolt 63 must first be removed. As the cover is advanced to the firing position shown in FIG. 4 the frame cover pin 61 engages the shoulder 60 of the insert member 38 thus to limit the forward displacement of the cover. Also the cross slide 56 will snap into place in the cover cut-out 118, FIG. 24, due to the centering action of the resiliently mounted plunger 130, 131, FIG. 13. The piston return bolt 63 is thereupon inserted and threaded into the cover 50. The tool is now ready for operation.

The method of operation is as follows: In loading the tool, the firing unit 55' is grasped with one hand and one of the fingers thereof used to shift the cross slide protective device 56 to the release position. The firing unit 55' and cover can then be drawn back to the cartridge ejecting position, thus exposing the open C at the front of the tool frame into which a section of conduit may be placed against the bushings 151, 152 and the member 164. Also exposed in this position is the aperture 70 in the cross slide cover, into which a blank cartridge 22 is dropped into the cartridge chamber bore 21. The bolt is then pushed forward, and, in one motion, completely encases the conduit and cartridge, the conduit being resiliently gripped by the clamping device 57. The cross slide protective device 56 is then shifted to the firing position, locking the cover to the frame, whereupon the trigger 87 may be pulled to fire. Thereafter the cross slide protective device 56 is shifted to the release position, whereupon the cover can again be withdrawn to the cartridge ejecting position by grasping the breech bolt, the spent shell thus being ejected through the cross slide cover aperture or opening 70. The severed pieces of conduit can now be removed from the now open C of the frame retainer arm. The tool is then inverted whereupon the sheared conduit chips fall out of the tool. An absolute minimum of manual motion is thus entailed from start to finish.

A feature of the tool resides, as above noted, in the chambering of the cartridge at right angles to the motion of the piston as illustrated in FIG. 4. There are a number of advantages in this feature. Since captive piston tools of the type shown, generally have a barrel bore diameter considerably in excess of the cartridge diameter, the right angled chambering of the cartridge chamber facilitates the loading of the large diameter piston ahead of the relatively small shell, without necessity for providing a safe, foolproof joint at the front end of the tool for muzzle loading of the piston, such as would otherwise be necessary if the cartridge chamber were axially aligned with the piston at the breech end of the tool. Moreover, since the barrel bore is considerably larger than that of the shell, the total force of the piston in the barrel plug is many times that of a conventional firearm. The cylindrical cartridge chamber member, inserted at right angles to the piston axis, through the frame and barrel plug apertures, provides a massive locking pin which secures and resists this high total explosive force occurring in the barrel bore. Again a tool of the type shown, employing a captive piston which is not ejected from the tool, tends to accumulate more powder residue than occurs in a conventional firearm. The right angle cartridge chamber assembly provides a means of instantaneous takedown or disassembly in the manner above described, so that all surfaces of the piston chamber and barrel bore can easily be cleaned with a brush. Also the right angled cartridge chamber assembly provides a tool of minimum length. A much greater length of tool would be required in a construction wherein the cartridge chamber is axially aligned with the barrel of the piston. A further advantage of this construction is that a cartridge chamber plug for handling cartridges of a given caliber, can easily be replaced by other cartridge chamber plugs of similar construction adapted for the insertion of cartridges of larger caliber, by simply making the cartridge bore of the requisite diameter and offsetting the same from the centerline whereby any caliber rim fire cartridge can be employed without necessity for relocating the firing pin. Since the barrel plug and cartridge chamber plug assembly provide, upon removal, the only entry through which the piston and cutter assembly can be inserted, this construction eliminates the necessity for safety interlocks that would otherwise be required, if the piston and cutter assembly were side or front loaded into the tool frame.

Referring to FIG. 4, mention was made above of the fact that the terminal portion 20 of the steel piston cap 19 is of considerably reduced diameter as compared to the bore of the sleeve barrel 5 and the piston 14, and that this reduced diameter terminus of the piston cap fits into a corresponding bore 20a, in the forward end of the barrel plug 6 through which the explosion chamber 21 has access to the bore 20a through the apertures 23a, 23 in the cartridge chamber and barrel plug, respectively. The significance of this is that experimental tests have shown that with a barrel of relatively large bore, such as that of the barrel 5, the initial expansion volume for the burning powder from the cartridge 22 is provided at so great a rate, as the piston moves forward that combustion of the powder is irregular. Powder of sufficiently fine granulation to be "quick enough" for a barrel of the relatively large bore of the barrel 5, is not commercially available, and would be dangerous to handle industrially even if it were. The smaller diameter protuberance 20 extending from the piston cap 19 into the barrel plug bore 20a, provides a smaller bore diameter during the period of powder burning as the piston initially moves forward, and a larger diameter bore during powder gas expansion, the latter as the piston cap protuberance moves out of the barrel plug cavity to permit of an expansion of the gases into the larger bore of the barrel 5. It will further be noted in this regard, that this protuberance 20 on the piston cap is nevertheless of considerably larger bore than the diameter of the shell 22 itself, and thus provides an initially exposed effective piston area large enough to apply tremendous acceleration to the piston by the powder up to the time it is completely burned, but at the same time, does not permit the powder to "snuff out" by the pressure drop that might otherwise occur if the explosion chamber bore 21 had access directly to the large bore of the barrel sleeve 5. With the arrangement shown, it is not until the powder is completely burned that the large bore of the barrel sleeve 5 is uncovered, so that the gas, expanding, can act on the larger piston area during the remainder of travel. A large diameter piston has the distinct advantage in providing maximum expansion volume for powder gas in a tool of minimum length, such as that shown. A tool of the relative dimensions shown having a bore of about 1" for the barrel 5 and an effective length of the frame barrel of about 1⅝" provides an explosion chamber which would be equivalent to a barrel of about 22" in length, provided the piston were of the same caliber as the shell.

Referring to FIGS. 2, 4–11, inc., the frame slot 37 in which the piston return bolt 63 is displaceable, also provides, as above noted, a gas escape passage communicating at one end with the bore of barrel sleeve 5 and at its opposite end with the frame outlet or passage 25. This passage, as shown by the lines of arrows in FIGS. 2, 6, 7 and 9, leads the gases above and beyond the piston and deposits them against the workpiece clamped in frame C arm, as soon as the piston has passed out of the barrel sleeve 5. In this passage the gases expand so as to minimize the blast effect, and by directing them against the workpiece, which is covered by the frame cover 50 during firing, protects the operator against them. By providing for escape of the gases in this way they have a "swept" or "aspirating" effect on the barrel residue. This is in contrast to expedients heretofore employed in certain captive piston type tools wherein no gas outlet passage is provided and in which the gases are caused to expand and cool in the barrel, with the result that such tools must be frequently cleaned.

Referring now to FIGS. 30–32, inc., there is shown a modification of the tool construction above described for varying the explosion force on the piston 14 from a blank cartridge 22 of standard charge. In this embodiment the sidewall of the cartridge chamber plug 210 is drilled through and counterbored opposite the outlet passage to slidably receive respectively the tip 211 and flanged head 211a of a screw 212 threaded through the barrel plug 213 and provided at its outer terminus with an indexing head 214. The barrel plug is also counterbored, as at 215, for slidable reception of the flanged head 211a. Retraction of flanged head 211a in counterbore 215 adds to the chamber volume any desired fraction of the volume of said counterbore; thus, enabling a control of the burning characteristics of the powder and the maximum pressure developed thereby throughout a range determined by the volume of counterbore 215. In this way the force impelling the piston from a blank cartridge of standard charge may be adjustably preset in accordance with the work force required of the tool mounted on the piston. As shown in FIG. 31, the knob 214 is indexed, as at 216, in proportion to the variation in explosive force resulting from any given adjustment. Also referring to FIGS. 30 and 32, the barrel plug has resiliently mounted therein a positioning detent 217 adapted to engage peripherally spaced notches 218 of the knob for presetting the knob in accordance with desired setting.

Reference will now be had to the bar stock cutting modification of the invention shown in FIGS. 33 and 34, wherein like elements are similarly designated as in FIGS. 1–23, inc. In this modification the bar stock 220 to be cut, is assembled in the retainer arm or work support 3 of the tool frame 1, against the arcuate or V-shaped front face 221 of a bushing 222 secured to the frame retainer arm 3 by means of a bolt 223, extending through a bore of the retainer arm and threading into the bushing as shown in FIG. 34. Secured to the frame cover 50 by means of a screw 224 is a substantially U-shaped clamping member 225 which transversely spans the cover 50 and has arms 226, 227 extending downwardly on opposite sides of the cover, these arms being provided with arcuate faces as at 228, which engage the front surface of the bar stock 220, with the cover 50 in the firing position of FIG. 33, thus to clamp the stock in position.

A cutter blade 229 for severing the bar stock, is mounted in advance of the piston 14, and is slidable in guides 230, 231. The cutter blade terminates at its rear end in a shank 232 which extends through the central assembly tube of the piston, and is secured thereto by means of the piston cap 19 in the manner above described with reference to the piston and cutter assembly of the previous embodiment. The muzzle end of the frame section 2 is vertically slotted as at 233 for passage of the cutter blade therethrough to the bar cutting position. FIG. 33 shows this tool modification with the piston and cutter blade in the firing position, while FIG. 34 shows the piston and blade advanced to the cutting position to sever the bar stock 220 in the manner illustrated.

The cutter blade 229 is preferably provided with a semicircular cutting edge 229a conforming to the diameter of the stock 220 to be severed, since this has been found to minimize the powder charge required for cutting and deformation of the stock. These same advantages result to a lesser extent if the arcuate contour of the cutting edge approximates in lesser degree the contour of the stock.

FIG. 35 shows a modified arrangement for clamping the bar stock 220 against the arcuate face of the bushing 222. This clamping mechanism comprises a relatively long lever arm 234 which, in the clamping position, extends along and rests against the under side of the tool handle 200 in the manner illustrated. This lever arm fulcrums about the point 235 of the frame retainer arm 3, against which point bears an adjusting screw 236 tapped through the terminus 237 of the lever arm 234 as shown. A link member 238 is pivotally connected at one end to the lever arm 234, as at 239, and at its opposite end, as at 240, to a clamping arm 241 which is pivotally mounted on the frame by means of a bolt 242, about which this clamping arm fulcrums.

To manipulate, the lever arm 234 is grasped and rotated counter-clockwise about the fulcrum point 235. This forces the link 238 to be displaced downwardly and to the right, thus rotating the clamping arm counter-clockwise about its fulcrum point 242 to its unclamped position. A section of bar stock 220 is thereupon inserted against the bushing 222 and the lever arm 234 manipulated in the opposite direction from that first described, i.e., it is now rotated clockwise about the fulcrum point 235. This reverses the direction of movement of the link 238, forcing it upward and to the left, whereby the clamping arm 241 is rotated clockwise about its fulcrum point 242 to clamp the bar stock 220 against the bushing 222. In the clamping position shown in the drawing the pivot point 239 of the link 238 is just above the dead center line established between the fulcrum point 235 of the screw 236 and the pivot point 240 of the link 238, thus providing a locking position. By adjusting the screw 236 in and out, the clamping assembly may be adjusted for clamping of bar stock of different diameters.

In the modification of the invention shown in FIG. 36 adapted for riveting, the tool frame 1 terminates flush with the muzzle end of the tubular frame section 2, as at 250, the C-shaped retainer arm of the previously described modifications being omitted. The rivet header or plunger 251 has integral with the rear end thereof a shank 252, which extends through the central assembly tube of the piston 14, and is secured thereto by means of the terminal piston cap 19 in the manner above described with reference to previous modifications. The muzzle end of the frame 1 has an outlet aperture 253 of a bore somewhat in excess of the diameter of the plunger 251, so that the plunger may pass freely therethrough together with the explosion gases. The outlet terminus of passage 253 is arcuately contoured over a sector 254, in conformity with the concave arcuate contour 255 of the plunger face, thus to impart a hemispherical contour to the swaged rivet head. The arcuate sector 254 terminates in a cylindrical bore 256 in which is assembled a thin-metal, centering disk 257 of cuplike configuration as shown. The barrel plug 6 inserted in the breech end of the frame 1, has mounted thereon, in this modification, a grip of handle 258, secured to the barrel plug by means of a threaded bolt 259, for purposes of applying pressure on the tool against the workpieces to be riveted together such, for example, as the angle member 260 and the channel member 261.

These angle and channel members are provided with holes as at 262, 263, for reception of a rivet 264, held in position during the riveting operation by means of a bucker 265, manipulated by a second workman. In the action position the first workman who actuates the tool, presses the same by means of the handle 258, firmly against the assembled workpieces 260, 261 in the relative positions illustrated in the drawing and thereupon actuates the trigger to impel the plunger 251 against the inner end 266 of the rivet, as a result of which this end is swaged to the hemispherical configuration shown at 267 of FIG. 37, thus to rivet the two workpieces 260, 261 together.

FIG. 38 shows a further modification for the application of so-called "cherry" riveting. In this modification the plunger 270 assembled to the piston 14 in the manner aforesaid, is provided with a flat faced terminus 271. As in the previous modification the tool frame 1 terminates flush with the muzzle end of the tubular frame section 2, and the muzzle end of this frame section is drilled as at 273 with sufficient bore to permit passage of the plunger 270 therethrough. The workpieces 274, 275 to be joined by means of a cherry rivet are apertured, as at 276, for reception of a rivet 277 of this type, which is inserted as shown with its hemispherical head 278 engaging a correspondingly contoured terminus 279 of the frame muzzle. The usual steel pin 280 is placed in the counterbore of the cherry rivet aperture, and, upon firing, is impacted by plunger 271, driving the pin home into the rivet and thereby enlarging the end of the rivet shank to secure workpieces 274 and 275 together, as shown in FIG. 38a.

Referring now to FIGS. 39 and 40, the modification of the invention shown for staking a threaded terminus on the end of a section of electrical conduit, or for joining two such conduit sections together by means of a coupling sleeve, comprises a pronged staking blade 290, assembled to the piston 14 in the manner above described, this blade being slidably displaceable along grooves 291, 292 of the tubular frame section 2. The muzzle end of this frame section is vertically slotted, as at 293, for passage of the staking blade therethrough to the staking position. Mounted in the retainer arm 3 of the frame, is a pronged bushing 294, of configuration corresponding to the staking blade 290. This bushing is secured to the frame by means of a threaded bolt 295, extending through a bore of the frame and threaded into the bushing as shown in FIG. 39. The workpieces to be joined, such as one end of an electrical conduit 296 and a slotted and threaded terminus therefore 297, are assembled against the bushing 294, in the manner illustrated in FIG. 39, and are held in place by means of a substantially U-shaped clamping member 298, which spans the frame cover 50 and is resiliently mounted thereon by means of an interposed rubber pad 299, the assembly being secured by a threaded bolt 300 threading into the frame cover. The clamping member has a pair of depending arms as at 301, which engages the front face of the workpiece assembly 296, 297, with the frame cover 50 advanced to the action or firing position as shown.

When the tool s friied, the staking blade 290 is impelled against the conduit 296 and within the slots 302, 303 of the threaded terminus 297, thereby to partially shear and upset the conduit metal in the manner illustrated at 304, 305 in transverse action in FIG. 40, thus to secure the threaded terminus 297 in locking engagement with the conduit 296.

Referring to FIGS. 43 and 44, there may be interposed between the end of the conduit 296 and the threaded terminus 297 a rubber gasket 306 or the like. And for so shearing and upsetting the metal of the conduit as to force the end of the conduit snugly against the threaded terminus 297, and thus compress the gasket 306, the prongs of the staking blade 290 and of the cooperating bushing 294 may be set at an angle as illustrated at 307, 308 of FIG. 43, thus to shear and displace the conduit metal in the manner illustrated at 309.

Referring to FIGS. 45, for uniting two conduit sections 310, 311 by means of an interposed coupling sleeve 312, having formed therein pairs of oppositely disposed slots as at 313, 314, one conduit section 310 is sleeved into the coupling member and the assembly mounted in the tool retainer arm 3 in the manner illustrated in FIG. 39. The tool is then fired, thus to stake the conduit to the coupling as shown at 315, thus to lock the coupling section 312 and the conduit terminus 310. Thereupon this same operation is repeated with the conduit terminus 311 assembled in the opposite end of the coupling member 312 against the bushing 294 of the retainer arm 3, and the tool again fired, to stake these two components together as at 316.

Referring to the hole punching modification of the invention shown in FIGS. 46 and 47, an annular shearing die 320 is mounted in a bore 321 of the frame retainer or work support 3, this die being resiliently held in place by means of a detent 322 which engages a peripheral groove 323 in the exterior surface of the die, this detent being backed by a small compression spring 324, for resilient displacement whereby the die 320 may be snapped into place or removed. Mounted on the piston 14 in the manner above described is a plunger 325 of a diameter slightly less than that of the die aperture 326. The clearance between the punch and die is preferably somewhat greater than that commonly used in die sets operated by conventional means. The workpiece to be punched, such for example, as the angle iron 327, is mounted on a supporting screw 328 which threads through the base of the frame retainer arm 3 as shown, this screw being adjustable up and down by means of the handle 329 secured to the base of the screw. For holding the workpiece securely against the die 320 during the punching operation, there is pivotally mounted on the frame retainer arm 3, as at 330, a camming member 331 provided with a lever arm 332 for manipulation. When the tool is fired the plunger 325 advances from the firing position of FIG. 46 to the punching position of FIG. 47, thus to punch out a circular slug 333 from the workpiece which drops down into a cavity 334 formed in the retainer arm 3 behind the die aperture 326.

Reference will now be had to FIGS. 48–50, incl., showing a modification of the invention adapted for the swaging of an electrical terminal onto the end of electrical cable or for joining two cable ends together by means of an interposed sleeve. Assembled on that piston 14, as above described, is a swaging head or plunger 340, having a knobbed head 341. Mounted in the retainer arm 3, is a backing plate 342, secured in place by means of a bolt 343 extending through a bore of the retainer arm 3 and threading into the backing plate. Assuming the tool is to be employed for swaging a terminus 344 onto the end of a cable section 345, the sleeved portion 346 of the terminal member is first assembled on the cable terminus 345, and the assembly then positioned against the backing plate 342 in the manner shown in FIG. 48, and held in place in the action or firing position by a substantially U-shaped clamping member 347, which spans the frame cover 50 and is secured thereto by means of a screw 348, this clamping member having depending arms as at 349 adapted to engage the front face of the workpiece assembly and hold it against the backing plate 342.

When the tool is fired the plunger 340 is advanced from the position of FIG. 48 to that of FIG. 49, whereby the knobbed head 341 of the plunger swages the sleeve portion of the terminal into snug engagement with the cable terminus 345 in the manner illustrated at 350, FIG. 49. For joining together two cable terminals 351, 352, FIG. 50, by means of an interposed sleeve member 353, the swaging operation above described is performed twice. That is to say, the sleeve 353 is first slipped onto the cable terminus 351 and the assembly mounted in the tool in the manner illustrated in FIG. 48 and the tool fired. The second cable terminus 352 is thereupon inserted in the opposite end of the sleeve 353 and the assembly thereupon again mounted in the retainer arm in the manner shown in FIG. 48 and the tool again fired. As a result of these two operations the sleeve 353 is swaged to the cable terminus 351 in the manner shown at 354 and to the cable terminus 352 in the manner shown at 355.

What is claimed is:

1. A powder actuated tool comprising a main frame and integrated therewith a C-frame providing a work support, a piston movable in said frame from a normal position to a fired position, a chamber adapted to contain a cartridge to be fired for impelling said piston from its normal position to its fired position, cartridge ejector means associated with said chamber, and a single rectilinearly moving means mounted on said main frame including breech mechanism means adapted to close said chamber with a cartridge therein and means for closing the mouth of said C-frame preparatory to firing such cartridge, said single rectilinearly moving means manually operable after the firing of such cartridge to retract said piston to normal position, to open said C-frame, to open said chamber and to actuate said ejector means to eject the fired cartridge.

2. A cartridge powered device comprising a frame including a barrel section having a breech end, cartridge chamber means communicating with said barrel section, and fire control means for exploding a cartridge within said cartridge chamber means, said fire control means comprising a trigger proximate said breech end of the barrel section and a safety device disposed at a location along the length of said barrel section spaced from its breech end, said trigger and safety device spaced from each other a distance such that independent and simultaneous manipulating engagement of said trigger by the one hand and said safety device by the other hand is required to actuate said fire control means.

3. A cartridge powered device according to claim 2 wherein said fire control means further comprises a hammer element displaceable solely in response to activation of said trigger, and said safety device comprises rectilinearly movable slide means on said frame including a shield positionable into and out of the path of traverse of said hammer element, and means biasing said slide means such that said shield is normally positioned in said path of traverse of the hammer element.

4. A powder actuated tool comprising a barrel, a piston in said barrel, a cartridge chamber communicating with said barrel, a cartridge chamber closing breech slide, a cartridge case extractor actuated by said breech slide, and a piston retracting means actuated by said breech slide, whereby air compressed in the retraction of said piston by said breech slide acts to eject from said chamber a cartridge case which has been loosened by said extractor.

5. A cartridge powered device comprising a frame having a terminal portion defining a work placement end, a barrel bore in said frame having a breech end portion and a muzzle end portion, cartridge receiving means closing said barrel bore at its end corresponding with its said breech end portion, said frame terminal portion closing said barrel bore at its end corresponding with its said muzzle end portion and being centrally apertured to provide a communicating passage between said work placement end and the interior of said barrel muzzle end portion, a piston within and displaceable along the length of said barrel bore through a working stroke in response to explosive actuation of a cartridge within said cartridge receiving means, said barrel breech and muzzle end portions extending in opposite directions from a location along the length of said barrel bore which is at a distance from said cartridge receiving means sustantially equal to the length of said piston, and said frame having interiorly disposed slot means defining a longitudinally extending gas escape passage communicating with said barrel muzzle end portion along the length thereof and with said passage of said frame terminal portion whereby, upon the passing of said piston out of said barrel breech end portion and into said barrel muzzle end portion during said working stroke, cartridge explosion gases are introduced through said gas escape passage into said barrel muzzle end portion along its length at substantially all locations ahead of said piston and thence through said frame terminal portion passage to discharge from said device at said work placement end of the frame.

6. In an explosively actuated tool: a frame including a barrel section having a breech end and a muzzle end, a piston displaceable therein, barrel closure means at the breech end of said barrel and retainer means at the muzzle end thereof for retaining said piston within the barrel, said closure means including a cartridge chamber having access to said barrel and accessible from said breech end, a cartridge ejector pivotally mounted on said frame, a carriage slidably and rectilinearly displaceable along said frame between a loading station of said tool at a retracted position of said carriage with respect to said frame and a firing station of said tool at an advanced position of said carriage with respect to said frame, said carriage exposing said cartridge chamber when in said retracted position, means on said carriage for actuating said cartridge ejector to eject a cartridge from said cartridge chamber on retraction of said carriage from said firing to said loading station and additional means on said carriage for closing said chamber and resetting said ejector for cartridge ejection on advancement of said carriage from said loading station to said firing station, said chamber closed and said ejector reset when said carriage is in said advanced position, and means for locking said carriage to said frame when positioned at said firing station.

7. In an explosively actuated tool: a frame including a barrel section having a breech end and a muzzle end, a piston displaceable therein, closure means including a cartridge chamber at the breech end of said barrel section and retainer means for said piston at the muzzle end thereof, said cartridge chamber accessible from said breech end, a carriage displaceable along said frame between a retracted position and an advanced position thereof with respect to said frame thereby providing respectively a loading station and a firing station of said tool, said carriage exposing said cartridge chamber when in said retracted position, a firing unit mounted on said carriage to be adjacent and operably associated with said cartridge chamber when said carriage is in advanced position, and a locking device on said carriage for locking the carriage to said frame when in said advanced position, said locking device having means positionable with respect to said firing unit to prevent actuation thereof such as will explosively actuate said tool.

8. In an explosively actuated tool: a frame including a barrel section having a breech end and a muzzle end, a piston displaceable therein, closure means including a cartridge chamber at the breech end of said barrel section and retainer means for said piston at the muzzle end thereof, said cartridge chamber accessible from said breech end, a carriage displaceable along said frame between a retracted position and an advanced position thereof with respect to said frame thereby providing respectively a loading station and a firing station of said tools, said carriage exposing said cartridge chamber when in said retracted position, a firing unit mounted on said carriage to be adjacent and operably associated with said cartridge chamber when said carriage is in advanced position, and a locking device on said carriage for locking the carriage to said frame when in said advanced position, said locking device having means positionable with respect to said firing unit to prevent actuation thereof such as will explosively actuate said tool, the last said means positionable with respect to said firing unit coincidentally with unlocking movement of said locking device for stationing said tool in other than said firing station whereby said means prevent said actuation of the firing unit except when said tool is stationed for firing.

9. In an explosively actuated tool: a frame including a barrel section having a breech end and a muzzle end, a piston displaceable therein, closure means including a cartridge chamber at the breech end of said barrel section and retainer means for said piston at the muzzle end thereof, said cartridge chamber accessible from said breech end, a carriage displaceable along said frame between a retracted position and an advanced position thereof with respect to said frame thereby providing respectively a loading station and a firing station of said tool, said carriage exposing said cartridge chamber when in said retracted position and closing said chamber when in said advanced position, cartridge seating means on said carriage for seating a cartridge in said chamber when said carriage is in said advanced position, cartridge ejecting means on said frame associated with means on said carriage for ejecting a cartridge from said chamber when the carriage is in said retracted position, said seating means and said ejecting means actuated respectively during movement of said carriage to its said advanced and retracted positions.

10. In an explosively actuated tool: a frame including a barrel section having a breech end and a muzzle end and terminating at the muzzle end in a hook-like workpiece retainer arm adapted for mounting a workpiece therein, a piston displaceable in said barrel section, breech closure means for said barrel section including a cartridge chamber having access to said barrel section and accessible from said breech end, retainer means for said piston at said muzzle end of the barrel section, a cover displaceable along said frame between a retracted position and an advanced position thereof with respect to said frame thereby providing respectively a loading station and a firing station of said tool, said cover closing the breech end access opening of the cartridge chamber and the open aperture of said hook-like retainer arm when in said advanced position and exposing said breech end access opening of the cartridge chamber and said open aperture of the hook-like retainer arm when in said retracted position, and clamping means on said cover cooperating with said retainer arm for clamping said workpiece in said arm when said cover is in said advanced position.

11. In an explosively actuated tool, means according to claim 10 wherein said clamping means is resiliently mounted on said cover and comprises a substantially U-shaped clamping member providing depending arms adapted to engage said workpiece when in said retainer arm.

12. In an explosively actuated tool: a frame including a barrel section having a breech end and a muzzle end and terminating at the muzzle end in a hook-like workpiece retainer arm adapted for mounting a workpiece therein a piston displaceable in said barrel section, breech closure means for said barrel section including a cartridge chamber having access to said barrel section and accessible from said breech end, retainer means for said piston at said muzzle end of the barrel section, a cover displaceable along said frame between a retracted position and an advanced position thereof with respect to said frame thereby providing respectively a loading station and a firing station of said tool, said cover closing the breech end access opening of the cartridge chamber and the open aperture of said hook-like retainer arm when in said advanced position and exposing said breech end access opening of the cartridge chamber and said open aperture of the hook-like retainer arm when in said retracted position, clamping means on said cover cooperating with said retainer arm for clamping said workpiece in said arm when said cover is in said advanced position, and a locking device on said cover associated with means of said frame for automatically locking said cover to said frame when the cover is in said advanced position.

13. In an explosively actuated tool: a frame including a barrel section having a breech end and a muzzle end and terminating at the muzzle end in a hook-like workpiece retainer arm adapted for mounting a workpiece therein, a piston displaceable in said barrel section, breech closure means for said barrel section including a cartridge chamber having access to said barrel section and accessible from said breech end, retainer means for said piston at said muzzle end of the barrel section, a cover displaceable along said frame between a retracted position and an advanced position thereof with respect to said frame thereby providing respectively a loading station and a firing station of said tool, said cover closing the breech end access opening of the cartridge chamber and the open aperture of said hook-like retainer arm when in said advanced position and exposing said breech end access opening of the cartridge chamber and said open aperture of the hook-like retainer arm when in said retracted position, clamping means on said cover cooperating with said retainer arm for clamping said workpiece in said arm when said cover is in said advanced position, a firing unit mounted on said cover to be adjacent and operably associated with said cartridge chamber when said cover is in said advanced position, and a locking device on said cover for locking the cover to said frame when in said advanced position, said locking device having means positionable with respect to said firing unit to prevent actuation thereof such as would explosively actuate said tool.

14. In an explosively actuated device in combination: a barrel having a breech end and a cartridge chamber therein at said breech end, a carriage displaceable along said barrel between a retracted position and an advanced position thereof with respect to said barrel thereby providing respectively a loading station and a firing station of said device, said cartridge chamber accessible from said breech end of the barrel section and said carriage exposing said cartridge chamber when in said retracted position, a firing unit mounted on said carriage to be adjacent and operably associated with said cartridge chamber when said carriage is in said advanced position, said firing unit having a displaceable hammer, a cross slide on said carriage including a shield positionable in and out of the path of traverse of said hamer, a transversely extending slot in said barrel and a cam of said cross slide adapted to enter said slot when said carriage is in said advanced position, said cross slide moveable to a fixed position thereof with respect to said barrel when said cam is in said slot to displace said shield from the path of traverse of said hammer, said shield positionable with respect to said hammer coincidentally with movement of said cross slide disengaging said cam from said slot for stationing said tool in other than said firing station whereby said shield is positioned in the path of traverse of said hammer to prevent actuation of said firing unit such as would explosively actuate said device except when said tool is stationed for firing and said cross slide is in said fixed position.

References Cited in the file of this patent

UNITED STATES PATENTS

| | | |
|---|---|---|
| 1,568,260 | Bates | Jan. 5, 1926 |
| 2,008,362 | Littlehale | July 16, 1935 |
| 2,133,364 | Temple | Oct. 18, 1938 |
| 2,140,338 | Temple | Dec. 13, 1938 |
| 2,302,647 | Temple | Nov. 17, 1942 |
| 2,356,595 | Kovcky | Aug. 22, 1944 |
| 2,454,528 | Temple | Nov. 23, 1948 |
| 2,585,195 | Walker | Feb. 12, 1952 |
| 2,645,772 | Walker | July 21, 1953 |
| 2,669,716 | Catlin | Feb. 23, 1954 |
| 2,673,980 | Ballachey et al. | Apr. 6, 1954 |
| 2,716,813 | Smyres | Sept. 6, 1955 |
| 2,740,965 | Phillips et al. | Apr. 10, 1956 |
| 2,773,259 | Broughton et al. | Dec. 11, 1956 |
| 2,775,762 | Hilti | Jan. 1, 1957 |

FOREIGN PATENTS

| | | |
|---|---|---|
| 62,069 | France | Dec. 22, 1954 |